(12) United States Patent
Guo et al.

(10) Patent No.: US 12,101,750 B2
(45) Date of Patent: Sep. 24, 2024

(54) MULTI-BAND INDICATION METHOD

(71) Applicant: HUAWEI TECHNOLOGIES CO., LTD., Shenzhen (CN)

(72) Inventors: Yuchen Guo, Shenzhen (CN); Yunbo Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 590 days.

(21) Appl. No.: 17/313,896

(22) Filed: May 6, 2021

(65) Prior Publication Data

US 2021/0266904 A1    Aug. 26, 2021

Related U.S. Application Data

(63) Continuation of application No. PCT/CN2019/116243, filed on Nov. 7, 2019.

(30) Foreign Application Priority Data

Nov. 7, 2018    (CN) .......................... 201811320739.5

(51) Int. Cl.
    *H04W 72/0453* (2023.01)
    *H04L 5/00* (2006.01)

(52) U.S. Cl.
    CPC ....... *H04W 72/0453* (2013.01); *H04L 5/0094* (2013.01)

(58) Field of Classification Search
    CPC .................................................. H04W 72/0453
    See application file for complete search history.

(56) References Cited

U.S. PATENT DOCUMENTS

2011/0255455 A1* 10/2011 Seok ................ H04W 52/0229
                                                            370/311
2014/0045514 A1    2/2014 Lee et al.
(Continued)

FOREIGN PATENT DOCUMENTS

| CN | 104584576 A | 4/2015 |
| CN | 104704885 A | 6/2015 |

(Continued)

OTHER PUBLICATIONS

IEEE Std 802.11tm-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

(Continued)

*Primary Examiner* — Ricky Q Ngo
*Assistant Examiner* — Stephen N Steiner
(74) *Attorney, Agent, or Firm* — HAUPTMAN HAM, LLP

(57) ABSTRACT

A multi-band indication method includes generating, by a first communications device, a first frame, and sending, by the first communications device, the first frame. The first frame includes a first operating class field, and in response to a basic service set (BSS) configured to be established by the first communications device configured to simultaneously operate in a first band and a second band, the first operating class field indicates a starting frequency of the second band. The first band is a band that includes a primary channel and the second band is a band that fails to include the primary channel.

18 Claims, 11 Drawing Sheets

(56) References Cited

U.S. PATENT DOCUMENTS

2015/0341945 A1* 11/2015 Panchal ................ H04L 5/0098
370/329
2017/0111918 A1   4/2017 Jechoux et al.
2018/0054847 A1*  2/2018 Cariou .............. H04W 28/0861
2021/0329721 A1* 10/2021 Kim ..................... H04W 76/15

FOREIGN PATENT DOCUMENTS

CN        105745858 A    7/2016
CN        107251472 A   10/2017

OTHER PUBLICATIONS

International Search Report issued in corresponding International Application No. PCT/CN2019/116243, dated Jan. 23, 2020, pp. 1-8.
European Search Report issued in corresponding European Application No. 19881091.3, mailed Nov. 12, 2021, pp. 1-10, European Patent Office, Munich, Germany.

* cited by examiner

MULTI-BAND INDICATION METHOD

CROSS-REFERENCE TO RELATED APPLICATIONS

This application is a continuation of International Application No. PCT/CN2019/116243, filed on Nov. 7, 2019, which claims priority to Chinese Patent Application No. 201811320739.5, filed on Nov. 7, 2018, the disclosures of the aforementioned applications are hereby incorporated by reference in their entireties.

TECHNICAL FIELD

This application relates to the field of communications technologies, and in particular, to a multi-band indication method.

BACKGROUND

Currently, large-scale application and deployment of wireless communications systems can provide various types of communication, for example, voice, data, and multimedia services, for a plurality of users.

The institute of electrical and electronics engineers (institute of electrical and electronics engineers, IEEE) 802.11 is one of current mainstream wireless access standards and has been widely used for commercial purposes. With exponential increase of WLAN wireless devices, a requirement for a WLAN wireless communication rate becomes higher. During evolution from 802.11a to 802.11g, 802.11n, and 802.11ac, available bands include 2.4 GHz and 5 GHz. To greatly increase a service transmission rate of a WLAN system, the IEEE is promoting an available band to 6 GHz.

In the IEEE 802.11a standard, a bandwidth of 20 megahertz (megahertz, MHz) is supported, and the bandwidth continuously increases in a subsequent standard evolution process. The 802.11n standard supports a maximum bandwidth of 40 MHZ, and the 802.11ac/ax standard supports a maximum bandwidth of 160 MHz.

An access point (access point, AP) device may establish a basic service set (basic service set, BSS), and indicate a size and a position of a working channel of the BSS to a station (station, STA). An indication manner used in some approaches is applicable to a bandwidth range of 160 MHz or lower, and in 802.11n and 802.11ac, spectrum resources of one band can be used for communication. A maximum bandwidth of extremely high throughput (extremely high throughput, EHT) used as a next-generation wireless fidelity (wireless-fidelity, Wi-Fi) standard is to be extended to 320 MHz. In some approaches, BSS bandwidth indication is not supported when a maximum bandwidth exceeds 160 MHz. In addition, in some approaches, spectrum resources of one band can be used. Consequently, resource utilization efficiency is reduced.

SUMMARY

Embodiments of this application provide a multi-band indication method and a communications device, to implement band indication in a multi-band aggregation scenario and improve resource utilization efficiency:

To resolve the foregoing problem, the embodiments of this application provide the following technical solutions.

According to a first aspect, an embodiment of this application provides a multi-band indication method, including: A first communications device generates a first frame. The first frame includes a first operating class field, and when a basic service set BSS established by the first communications device simultaneously works in a first band and a second band, the first operating class field is used to indicate a starting frequency of the second band. The first band is a band that includes a primary channel, and the second band is a band that does not include the primary channel. The first communications device sends the first frame.

In some embodiments, the first frame generated by the first communications device includes the first operating class field, and the first operating class field is used to indicate the starting frequency of the second band. The first communications device sends the first frame to a second communications device. Therefore, the second communications device may obtain the first operating class field based on the received first frame, and may determine the starting frequency of the second band by parsing the first operating class field. Therefore, in some embodiments, band indication can be implemented in a multi-band aggregation scenario, and resource utilization efficiency can be improved.

According to a second aspect, an embodiment of this application further provides a multi-band indication method, including: A second communications device receives a first frame from a first communications device. The second communications device parses the first frame to obtain a first operating class field. The second communications device determines, based on the first operating class field, a starting frequency of a second band in which a basic service set BSS established by the first communications device works. The BSS simultaneously works in a first band and the second band, the first band is a band that includes a primary channel, and the second band is a band that does not include the primary channel.

In some embodiments, the first frame generated by the first communications device includes the first operating class field, and the first operating class field is used to indicate the starting frequency of the second band. The first communications device sends the first frame to the second communications device. Therefore, the second communications device may obtain the first operating class field based on the received first frame, and may determine the starting frequency of the second band by parsing the first operating class field. Therefore, in some embodiments, band indication can be implemented in a multi-band aggregation scenario, and resource utilization efficiency can be improved.

In a possible implementation of the first aspect or the second aspect, the first frame further includes N channel center frequency segment fields and a multi-band aggregation mode field, and a value of N is a positive integer greater than or equal to 2. The multi-band aggregation mode field is used to indicate a band to which a frequency segment corresponding to at least one channel center frequency segment field in the N channel center frequency segment fields belongs. The N channel center frequency segment fields are used to indicate N frequency segments in which the BSS works. In some embodiments, the N channel center frequency segment fields are used to indicate the N frequency segments in which the BSS works. For example, in some embodiments, the value of N may be 4, 3, or 2. In some embodiments, each channel center frequency segment field is used to indicate one frequency segment in which the BSS works. The first frame further includes the multi-band aggregation mode field, and the multi-band aggregation mode field is used to indicate that the frequency segment corresponding to the at least one channel center frequency segment field in the N channel center frequency segment fields belongs to the first band or the second band. In some embodiments, the multi-band aggregation mode field may include a plurality of values, and each value indicates a band to which one of the N channel center frequency segment fields belongs.

In a possible implementation of the first aspect or the second aspect, when N is equal to 4, the N channel center frequency segment fields are a first channel center frequency segment field, a second channel center frequency segment field, a third channel center frequency segment field, and a fourth channel center frequency segment field. The multi-band aggregation mode field is used to indicate bands to which frequency segments corresponding to the second channel center frequency segment field, the third channel center frequency segment field, and the fourth channel center frequency segment field belong. The first channel center frequency segment field, the second channel center frequency segment field, the third channel center frequency segment field, and the fourth channel center frequency segment field are used to indicate four frequency segments in which the BSS works. For example, in some embodiments, the value of the quantity N of frequency segments in the first frame is 4. The N channel center frequency segment fields are the first channel center frequency segment field, the second channel center frequency segment field, the third channel center frequency segment field, and the fourth channel center frequency segment field. The frequency segment corresponding to the first channel center frequency segment field belongs to the first band in which the primary channel is located. The multi-band aggregation mode field may indicate the bands to which the frequency segments corresponding to the second channel center frequency segment field, the third channel center frequency segment field, and the fourth channel center frequency segment field belong. The second channel center frequency segment field, the third channel center frequency segment field, and the fourth channel center frequency segment field may belong to the first band or the second band. This specifically depends on an application scenario.

In a possible implementation of the first aspect or the second aspect, the first frame further includes a channel bandwidth field, and the channel bandwidth field is used to indicate a BSS bandwidth. A length of the channel bandwidth field is one byte. When a value of the channel bandwidth field is 4, the channel bandwidth field is used to indicate that the BSS bandwidth is 320 MHz, 160+160 MHZ, 80+80+160 MHZ, 160+80+80 MHz, 80+160+80 MHZ, 80+80+80+80 MHZ. 240+80 MHZ, 80+240 MHZ, 240 MHZ, 160+80 MHZ, 80+160 MHZ, or 80+80+80 MHZ. Different values of the channel bandwidth field may be used to indicate BSS bandwidths. The present application is not limited that a same value of the channel bandwidth field may indicate a plurality of BSS bandwidths. A position of a working channel of the BSS may be determined by using the first channel center frequency segment field, the second channel center frequency segment field, the third channel center frequency segment field, and the fourth channel center frequency segment field. The first communications device may determine, based on the BSS established by the first communications device, the BSS bandwidth and the position of the working channel that is used. For example, in some embodiments, the channel bandwidth field in the first frame may be specifically an EHT channel width field, and a length of the EHT channel width field is one byte. The channel bandwidth field is used to indicate the BSS bandwidth. For example, there may be a plurality of types of BSS bandwidths. When the BSS bandwidth is extended to 320 MHZ, a specific mode of the BSS band-width may be further classified into several different forms: 320 MHZ, 160+160 MHZ, 160+80+80 MHZ, 80+80+160 MHZ, or 80+80+80+80 MHZ. "(+)" indicates that a total bandwidth consists of two or more different frequency segments.

In a possible implementation of the first aspect or the second aspect, a value of the first channel center frequency segment field, a value of the second channel center frequency segment field, a value of the third channel center frequency segment field, and a value of the fourth channel center frequency segment field are obtained by using a value of a current channel center frequency indicator 0, a value of a current channel center frequency indicator 1, a value of a current channel center frequency indicator 2, and a value of a current channel center frequency indicator 3. The first communications device first determines the value of the channel bandwidth field, the first communications device determines the quantity of frequency segments, and the first communications device determines values of four indicators based on the quantity of frequency segments and a center frequency indicator used by each frequency segment. The values of the four indicators include the value of the current channel center frequency indicator 0, the value of the current channel center frequency indicator 1, the value of the current channel center frequency indicator 2, and the value of the current channel center frequency indicator 3. For example, the current channel center frequency indicator 0 may be specifically dot11CurrentChannelCenterFrequencyIndex0, the current channel center frequency indicator 1 may be specifically dot11CurrentChannelCenterFrequencyIndex1, the current channel center frequency indicator 2 may be specifically dot11 CurrentChannelCenterFrequencyIndex2, and the current channel center frequency indicator 3 may be specifically dot11CurrentChannelCenterFrequencyIndex3.

In a possible implementation of the first aspect or the second aspect, when a position of a working channel of the BSS is the following frequency position: 320 MHZ, the value of the first channel center frequency segment field is the value of the current channel center frequency indicator 0 minus 24, the value of the second channel center frequency segment field is the value of the current channel center frequency indicator 0 minus 8, the value of the third channel center frequency segment field is the value of the current channel center frequency indicator 0 plus 8, and the value of the fourth channel center frequency segment field is the value of the current channel center frequency indicator (plus 24; or when a position of a working channel of the BSS is the following frequency position: 160+160 MHZ, the value of the first channel center frequency segment field is the value of the current channel center frequency indicator 0 minus 8, the value of the second channel center frequency segment field is the value of the current channel center frequency indicator (plus 8, the value of the third channel center frequency segment field is the value of the current channel center frequency indicator 1 minus 8, and the value of the fourth channel center frequency segment field is the value of the current channel center frequency indicator 1 plus 8; or when a position of a working channel of the BSS is the following frequency position: 80+80+160 MHZ, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2 minus 8, and the value of the fourth channel center frequency segment field is the value of the current channel center frequency indicator 2 plus 8; or when a position of a working channel of the BSS is the following frequency position: 160+80+80 MHZ, the value of the first channel center frequency segment field is the value of the current channel center frequency indicator 0 minus 8, the value of the second channel center frequency segment field is the value of the current channel center frequency indicator 0 plus 8, the value of the third channel center frequency segment field is the value of the current channel center frequency indicator 1, and the value of the fourth channel center frequency segment field is the value of the current channel center frequency indicator 2; or when a position of a working channel of the BSS is the following frequency position: 80+160+80 MHZ, the value of the first channel center frequency segment field is the value of the current channel center frequency indicator 0, the value of the second channel center frequency segment field is the value of the current channel center frequency indicator 1 minus 8, the value of the third channel center frequency segment field is the value of the current channel center frequency indicator 1 plus 8, and the value of the fourth channel center frequency segment field is the value of the current channel center frequency indicator 2; or when a position of a working channel of the BSS is the following frequency position: 80+80+80+80 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, and the value of the fourth channel center frequency segment field is the value of the current channel center frequency indicator 3; or when a position of a working channel of the BSS is the following frequency position: 240+80 MHZ, the value of the first channel center frequency segment field is the value of the current channel center frequency indicator 0 minus 16, the value of the second channel center frequency segment field is the value of the current channel center frequency indicator 0, the value of the third channel center frequency segment field is the value of the current channel center frequency indicator 0 plus 16, and the value of the fourth channel center frequency segment field is the value of the current channel center frequency indicator 1; or when a position of a working channel of the BSS is the following frequency position: 80+240 MHZ, the value of the first channel center frequency segment field is the value of the current channel center frequency indicator 0, the value of the second channel center frequency segment field is the value of the current channel center frequency indicator 1 minus 16, the value of the third channel center frequency segment field is the value of the current channel center frequency indicator 1, and the value of the fourth channel center frequency segment field is the value of the current channel center frequency indicator 1 plus 16; or when a position of a working channel of the BSS is the following frequency position: 240 MHz, the value of the first channel center frequency segment field is the value of the current channel center frequency indicator 0 minus 16, the value of the second channel center frequency segment field is the value of the current channel center frequency indicator 0, the value of the third channel center frequency segment field is the value of the current channel center frequency indicator 0 plus 16, and the value of the fourth channel center frequency segment field is 0; or when a position of a working channel of the BSS is the following frequency position: 160+80 MHZ, the value of the first channel center frequency segment field is the value of the current channel center frequency indicator 0 minus 8, the value of the second channel center frequency segment field is the value of the current channel center frequency indicator 0 plus 8, the value of the third channel center frequency segment field is the value of the current channel center frequency indicator 1, and the value of the fourth channel center frequency segment field is 0; or when a position of a working channel of the BSS is the following frequency position: 80+160 MHZ, the value of the first channel center frequency segment field is the value of the current channel center frequency indicator 0, the value of the second channel center frequency segment field is the value of the current channel center frequency indicator 1 minus 8, the value of the third channel center frequency segment field is the value of the current channel center frequency indicator 1 plus 8, and the value of the fourth channel center frequency segment field is 0; or when a position of a working channel of the BSS is the following frequency position: 80+80+80 MHZ, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, and the value of the fourth channel center frequency segment field is 0.

It should be noted that, after the first communications device determines the position of the working channel of the BSS, the first communications device may separately determine the value of the current channel center frequency indicator 0, the value of the current channel center frequency indicator 1, the value of the current channel center frequency indicator 2, and the value of the current channel center frequency indicator 3 based on the quantity of frequency segments of the working bandwidth of the BSS and the center frequency of each frequency segment. The center frequency of the frequency segment and the current channel center frequency indicator may be determined by using a preset mapping relationship.

In a possible implementation of the first aspect or the second aspect, the first frame further includes a segment size field, and the segment size field is used to indicate a segment size of each of the N channel center frequency segment fields. For example, in some embodiments, an EHT operation information field may further carry a segment size field, and the segment size field is used to indicate sizes of four frequency segments. In some embodiments, each frequency segment may not be 80 MHZ, but may be indicated by the segment size field. The segment size may be 20 MHZ, 40 MHZ, 80 MHZ, or 160 MHZ. For another example, in some embodiments, the segment size may be 20 MHZ, 40 MHZ, or 80 MHz. For another example, in some embodiments, the segment size may be 40 MHz or 80 MHZ. For another example, the segment size may be 20 MHz or 80 MHZ. For another example, in some embodiments, the segment size may be 80 MHZ or 160 MHZ. The sizes of the four frequency segments may be the same or may be different.

In a possible implementation of the first aspect or the second aspect, when N is equal to 4, the N channel center frequency segment fields are a first channel center frequency segment field, a second channel center frequency segment field, a fifth channel center frequency segment field, and a sixth channel center frequency segment field. The first channel center frequency segment field and the second channel center frequency segment field are in a first operation element field. The fifth channel center frequency segment field and the sixth channel center frequency segment field are in a second operation element field. The first operation element field and the second operation element field are in the first frame. The first frame may include two operation element fields: the first operation element field and the second operation element field. The first operation element field may be specifically an EHT operation information field. The first channel center frequency segment field and the second channel center frequency segment field are in the first operation element field. For example, the first channel center frequency segment field may be a CCFS 3, and the second channel center frequency segment field may be a CCFS 4. The fifth channel center frequency segment field and the sixth channel center frequency segment field are in the second operation element field. The second operation element field may be specifically a VHT operation information field. The fifth channel center frequency segment field may be a CCFS 0, and the sixth channel center frequency segment field may be a CCFS 1. By using the two different operation element fields, four channel center frequency segment fields may be carried in the first frame, to implement BSS bandwidth indication when a maximum bandwidth is 320 MHZ or 240 MHZ.

In a possible implementation of the first aspect or the second aspect, the first channel center frequency segment field and the second channel center frequency segment field are used to indicate two frequency segments, in the second band, in which the BSS works. The fifth channel center frequency segment field and the sixth channel center frequency segment field are used to indicate two frequency segments, in the first band, in which the BSS works. The first channel center frequency segment field may be a CCFS 3, the second channel center frequency segment field may be a CCFS 4, the fifth channel center frequency segment field may be a CCFS 0, and the sixth channel center frequency segment field may be a CCFS 1. To maintain backward compatibility; in some embodiments, meanings of the CCFS 0 and the CCFS 1 may not be modified, and values of the CCFS 3 and the CCFS 4 are designed to support a 320 MHz bandwidth and multi-band aggregation. In one manner, by default, the CCFS 0 and the CCFS 1 indicate the first band, and the CCFS 3 and the CCFS 4 indicate the second band.

In a possible implementation of the first aspect or the second aspect, the first frame further includes the multi-band aggregation mode field. The fifth channel center frequency segment field and the sixth channel center frequency segment field are used to indicate two frequency segments, in the first band, in which the BSS works. The multi-band aggregation mode field is used to indicate bands to which frequency segments corresponding to the first channel center frequency segment field and the second channel center frequency segment field belong. The first channel center frequency segment field may be a CCFS 3, the second channel center frequency segment field may be a CCFS 4, the fifth channel center frequency segment field may be a CCFS 0, and the sixth channel center frequency segment field may be a CCFS 1. To maintain backward compatibility, in some embodiments, meanings of the CCFS 0 and the CCFS 1 are not modified, and values of the CCFS 3 and the CCFS 4 support a 320 MHz bandwidth and multi-band aggregation. In another manner, the CCFS 0 and the CCFS 1 indicate the first band by default, and the multi-band aggregation mode field is used to indicate a band to which the CCFS 3 and the CCFS 4 belong.

In a possible implementation of the first aspect or the second aspect, the fifth channel center frequency segment field is used to indicate a center frequency of an 80 MHz frequency segment in which the primary channel is located. The sixth channel center frequency segment field is used to: when the 80 MHz frequency segment in which the primary channel is located is in one contiguous 160 MHz frequency segment, indicate a center frequency of the contiguous 160 MHZ frequency segment in which the primary channel is located; or when the 80 MHz frequency segment in which the primary channel is located is not in one contiguous 160 MHz frequency segment, indicate a center frequency of a second 80 MHz frequency segment in addition to the 80 MHz frequency segment in which the primary channel is located. The first channel center frequency segment field is used to: when there is a third 80 MHz frequency segment in addition to the 80 MHz frequency segment in which the primary channel is located and the second 80 MHZ frequency segment, indicate a center frequency of the third 80 MHz frequency segment. The second channel center frequency segment field is used to: when the third 80 MHz frequency segment is in one contiguous 160 MHz frequency segment, indicate a center frequency of the contiguous 160 MHz frequency segment in which the third 80 MHz frequency segment falls; or when the third 80 MHz frequency segment is not in one contiguous 160 MHz frequency segment, and there is a fourth 80 MHz frequency segment in addition to the 80 MHz frequency segment in which the primary channel is located, the second 80 MHz frequency segment, and the third 80 MHz frequency segment, indicate a center frequency of the fourth 80 MHz frequency segment; or when there is a fourth 80 MHz frequency segment in addition to the 80 MHz frequency segment in which the primary channel is located, the second 80 MHz frequency segment, and the third 80 MHz frequency segment, indicate a center frequency of the fourth 80 MHz frequency segment.

In a possible implementation of the first aspect or the second aspect, when a value of the first operating class field is a preset value, the first operating class field is used to indicate that the BSS works in the first band, and the BSS does not support the second band. The first operating class field in the first frame may be an operating class field in a management frame. When the operating class field is a special value (for example, 0 or 255), it indicates that the second band does not exist, the BSS works in the first band, and the BSS does not support the second band. In other words, the first communications device uses the first band for communication, and the first communications device does not support the second band.

In a possible implementation of the first aspect or the second aspect, the first frame further includes a band identifier field, and the band identifier field is used to identify the second band. Therefore, after receiving the band identifier field in the first frame, the second communications device may identify the second band based on the band identifier field.

In a possible implementation of the first aspect or the second aspect, the first operating class field is in a first operation information field. The first operation information field is in the first operation element field. The first operation element field is in the first frame. The first frame may include an operation element field, the operation element field may include an operation information field, and the operation information field may include an operating class field. In addition, each generation of standard is compatible with previous generations of standards. Therefore, previous generations of designs of operation information are considered in a new generation of design of operation information. For example, in some embodiments, a next-generation Wi-Fi standard is EHT, and a maximum bandwidth of the EHT is to be extended. For example, the maximum bandwidth may be extended to 240 MHz or 320 MHZ. Therefore, a new frame structure format is designed for the first frame after the bandwidth is extended. In some embodiments, the first communications device may generate the first frame. The first frame may include the first operating class field, and the first operating class field is used to indicate the starting frequency of the second band.

In a possible implementation of the first aspect or the second aspect, the first frame further includes a second operating class field, and the second operating class field is used to indicate a starting frequency of the first band. In some other embodiments, the first frame further includes the second operating class field. To be specific, the first frame includes two operating class fields, the first operating class field is used to indicate the starting frequency of the second band, and the second operating class field is used to indicate the starting frequency of the first band. Therefore, after receiving the second operating class field in the first frame, the second communications device may determine the starting frequency of the first band based on the second operating class field.

In a possible implementation of the first aspect or the second aspect, the first frame further includes 2N channel center frequency segment fields and a third operating class field, and a value of N is a positive integer greater than or equal to 2. The first operating class field is further used to indicate that N channel center frequency segment fields in the 2N channel center frequency segment fields belong to the second band. The third operating class field is used to indicate that the other N channel center frequency segment fields in the 2N channel center frequency segment fields belong to the first band. The 2N channel center frequency segment fields are used to indicate N frequency segments in which the BSS works.

In a possible implementation of the first aspect or the second aspect, when N is equal to 4, the 2N channel center frequency segment fields are a first channel center frequency segment field, a second channel center frequency segment field, a third channel center frequency segment field, a fourth channel center frequency segment field, a seventh channel center frequency segment field, an eighth channel center frequency segment field, a ninth channel center frequency segment field, and a tenth channel center frequency segment field. The first operating class field is used to indicate the first channel center frequency segment field, the second channel center frequency segment field, the third channel center frequency segment field, and the fourth channel center frequency segment field belong to the second band. The first channel center frequency segment field, the second channel center frequency segment field, the third channel center frequency segment field, and the fourth channel center frequency segment field are used to indicate four frequency segments, in the second band, in which the BSS works. The third operating class field is used to indicate that the seventh channel center frequency segment field, the eighth channel center frequency segment field, the ninth channel center frequency segment field, and the tenth channel center frequency segment field belong to the first band. The seventh channel center frequency segment field, the eighth channel center frequency segment field, the ninth channel center frequency segment field, and the tenth channel center frequency segment field are used to indicate four frequency segments, in the first band, in which the BSS works.

According to a third aspect, an embodiment of this application further provides a multi-band indication method, including: A first communications device generates a first frame. The first frame includes N channel center frequency segment fields and a multi-band aggregation mode field, and when a basic service set BSS established by the first communications device simultaneously works in a first band and a second band, the multi-band aggregation mode field is used to indicate that a frequency segment corresponding to at least one channel center frequency segment field in the N channel center frequency segment fields belongs to the first band or the second band. The N channel center frequency segment fields are used to indicate N frequency segments in which the BSS works. The first band is a band that includes a primary channel, the second band is a band that does not include the primary channel, and a value of N is a positive integer greater than or equal to 2. The first communications device sends the first frame.

In some embodiments, the first frame generated by the first communications device includes the N channel center frequency segment fields and the multi-band aggregation mode field, and the first communications device sends the first frame to a second communications device. Therefore, the second communications device may obtain the N channel center frequency segment fields and the multi-band aggregation mode field based on the received first frame, and accordingly determine that the N frequency segments in which the BSS works belong to the first band or the second band. Therefore, in some embodiments, frequency segment indication can be implemented in a multi-band aggregation scenario, and resource utilization efficiency can be improved.

According to a fourth aspect, an embodiment of this application further provides a multi-band indication method, including: A second communications device receives a first frame from a first communications device. The second communications device parses the first frame to obtain N channel center frequency segment fields and a multi-band aggregation mode field. A value of N is a positive integer greater than or equal to 2. The second communications device determines, based on the N channel center frequency segment fields and the multi-band aggregation mode field, that N frequency segments in which a basic service set BSS established by the first communications device works belong to a first band or a second band. The first band is a band that includes a primary channel, and the second band is a band that does not include the primary channel.

In some embodiments, the first frame generated by the first communications device includes the N channel center frequency segment fields and the multi-band aggregation mode field, and the first communications device sends the first frame to the second communications device. Therefore, the second communications device may obtain the N channel center frequency segment fields and the multi-band aggregation mode field based on the received first frame, and accordingly determine that the N frequency segments in which the BSS works belong to the first band or the second band. Therefore, in some embodiments, frequency segment indication can be implemented in a multi-band aggregation scenario, and resource utilization efficiency can be improved.

In a possible implementation of the third aspect or the fourth aspect, when N is equal to 4, the N channel center frequency segment fields are a first channel center frequency segment field, a second channel center frequency segment field, a third channel center frequency segment field, and a fourth channel center frequency segment field. The multi-band aggregation mode field is used to indicate bands to which frequency segments corresponding to the second channel center frequency segment field, the third channel center frequency segment field, and the fourth channel center frequency segment field belong. The first channel center frequency segment field, the second channel center frequency segment field, the third channel center frequency segment field, and the fourth channel center frequency segment field are used to indicate four frequency segments in which the BSS works. For example, the value of the quantity N of frequency segments in the first frame is 4. The N channel center frequency segment fields are the first channel center frequency segment field, the second channel center frequency segment field, the third channel center frequency segment field, and the fourth channel center frequency segment field. The frequency segment corresponding to the first channel center frequency segment field belongs to the first band in which the primary channel is located. The multi-band aggregation mode field may indicate the bands to which the frequency segments corresponding to the second channel center frequency segment field, the third channel center frequency segment field, and the fourth channel center frequency segment field belong. The second channel center frequency segment field, the third channel center frequency segment field, and the fourth channel center frequency segment field may belong to the first band or the second band. This specifically depends on an application scenario.

In a possible implementation of the third aspect or the fourth aspect, the first frame further includes a channel bandwidth field, and the channel bandwidth field is used to indicate a BSS bandwidth. A length of the channel bandwidth field is one byte. When a value of the channel bandwidth field is 4, the channel bandwidth field is used to indicate that the BSS bandwidth is 320 MHz, 160+160 MHZ, 80+80+160 MHZ, 160+80+80 MHZ. 80+160+80 MHZ, 80+80+80+80 MHZ, 240+80 MHZ, 80+240 MHZ, 240 MHZ, 160+80 MHZ, 80+160 MHZ, or 80+80+80 MHZ. Different values of the channel bandwidth field may be used to indicate BSS bandwidths. It is not limited that a same value of the channel bandwidth field may indicate a plurality of BSS bandwidths. A position of a working channel of the BSS may be determined by using the first channel center frequency segment field, the second channel center frequency segment field, the third channel center frequency segment field, and the fourth channel center frequency segment field. The first communications device may determine, based on the BSS established by the first communications device, the BSS bandwidth and the position of the working channel that is used. For example, the channel bandwidth field in the first frame may be specifically an EHT channel width field, and a length of the EHT channel width field is one byte. The channel bandwidth field is used to indicate the BSS bandwidth. For example, there may be a plurality of types of BSS bandwidths. When the BSS bandwidth is extended to 320 MHZ, a specific mode of the BSS bandwidth may be further classified into several different forms: 320 MHZ, 160+160 MHZ, 160+80+80 MHZ, 80+80+160 MHZ, or 80+80+80+80 MHZ. "(+)" indicates that a total bandwidth consists of two or more different frequency segments.

In a possible implementation of the third aspect or the fourth aspect, a value of the first channel center frequency segment field, a value of the second channel center frequency segment field, a value of the third channel center frequency segment field, and a value of the fourth channel center frequency segment field are obtained by using a value of a current channel center frequency indicator 0, a value of a current channel center frequency indicator 1, a value of a current channel center frequency indicator 2, and a value of a current channel center frequency indicator 3. The first communications device first determines the value of the channel bandwidth field, the first communications device determines the quantity of frequency segments, and the first communications device determines values of four indicators based on the quantity of frequency segments and a center frequency indicator used by each frequency segment. The values of the four indicators include the value of the current channel center frequency indicator 0, the value of the current channel center frequency indicator 1, the value of the current channel center frequency indicator 2, and the value of the current channel center frequency indicator 3. For example, the current channel center frequency indicator 0 may be specifically dot11CurrentChannelCenterFrequencyIndex0, the current channel center frequency indicator 1 may be specifically dot11CurrentChannelCenterFrequencyIndex1, the current channel center frequency indicator 2 may be specifically dot11CurrentChannelCenterFrequencyIndex2, and the current channel center frequency indicator 3 may be specifically dot11CurrentChannelCenterFrequencyIndex3.

In a possible implementation of the third aspect or the fourth aspect, when a position of a working channel of the BSS is the following frequency position: 320 MHZ, the value of the first channel center frequency segment field is the value of the current channel center frequency indicator 0 minus 24, the value of the second channel center frequency segment field is the value of the current channel center frequency indicator 0 minus 8, the value of the third channel center frequency segment field is the value of the current channel center frequency indicator 0 plus 8, and the value of the fourth channel center frequency segment field is the value of the current channel center frequency indicator 0 plus 24; or when a position of a working channel of the BSS is the following frequency position: 160+160 MHZ, the value of the first channel center frequency segment field is the value of the current channel center frequency indicator 0 minus 8, the value of the second channel center frequency segment field is the value of the current channel center frequency indicator 0 plus 8, the value of the third channel center frequency segment field is the value of the current channel center frequency indicator 1 minus 8, and the value of the fourth channel center frequency segment field is the value of the current channel center frequency indicator 1 plus 8; or when a position of a working channel of the BSS is the following frequency position: 80+80+160 MHZ, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2 minus 8, and the value of the fourth channel center frequency segment field is the value of the current channel center frequency indicator 2 plus 8; or when a position of a working channel of the BSS is the following frequency position: 160+80+80 MHz, the value of the first channel center frequency segment field is the value of the current channel center frequency indicator 0 minus 8, the value of the second channel center frequency segment field is the value of the current channel center frequency indicator 0 plus 8, the value of the third channel center frequency segment field is the value of the current channel center frequency indicator 1, and the value of the fourth channel center frequency segment field is the value of the current channel center frequency indicator 2; or when a position of a working channel of the BSS is the following frequency position: 80+160+80 MHz, the value of the first channel center frequency segment field is the value of the current channel center frequency indicator 0, the value of the second channel center frequency segment field is the value of the current channel center frequency indicator 1 minus 8, the value of the third channel center frequency segment field is the value of the current channel center frequency indicator 1 plus 8, and the value of the fourth channel center frequency segment field is the value of the current channel center frequency indicator 2; or when a position of a working channel of the BSS is the following frequency position: 80+80+80+80 MHZ, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, and the value of the fourth channel center frequency segment field is the value of the current channel center frequency indicator 3; or when a position of a working channel of the BSS is the following frequency position: 240+80 MHz, the value of the first channel center frequency segment field is the value of the current channel center frequency indicator 0 minus 16, the value of the second channel center frequency segment field is the value of the current channel center frequency indicator 0, the value of the third channel center frequency segment field is the value of the current channel center frequency indicator 0 plus 16, and the value of the fourth channel center frequency segment field is the value of the current channel center frequency indicator 1; or when a position of a working channel of the BSS is the following frequency position: 80+240 MHZ, the value of the first channel center frequency segment field is the value of the current channel center frequency indicator 0, the value of the second channel center frequency segment field is the value of the current channel center frequency indicator 1 minus 16, the value of the third channel center frequency segment field is the value of the current channel center frequency indicator 1, and the value of the fourth channel center frequency segment field is the value of the current channel center frequency indicator 1 plus 16; or when a position of a working channel of the BSS is the following frequency position: 240 MHZ, the value of the first channel center frequency segment field is the value of the current channel center frequency indicator 0 minus 16, the value of the second channel center frequency segment field is the value of the current channel center frequency indicator 0, the value of the third channel center frequency segment field is the value of the current channel center frequency indicator 0 plus 16, and the value of the fourth channel center frequency segment field is 0; or when a position of a working channel of the BSS is the following frequency position: 160+80 MHZ, the value of the first channel center frequency segment field is the value of the current channel center frequency indicator 0 minus 8, the value of the second channel center frequency segment field is the value of the current channel center frequency indicator 0 plus 8, the value of the third channel center frequency segment field is the value of the current channel center frequency indicator 1, and the value of the fourth channel center frequency segment field is 0; or when a position of a working channel of the BSS is the following frequency position: 80+160 MHZ, the value of the first channel center frequency segment field is the value of the current channel center frequency indicator 0, the value of the second channel center frequency segment field is the value of the current channel center frequency indicator 1 minus 8, the value of the third channel center frequency segment field is the value of the current channel center frequency indicator 1 plus 8, and the value of the fourth channel center frequency segment field is 0; or when a position of a working channel of the BSS is the following frequency position: 80+80+80 MHZ, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, and the value of the fourth channel center frequency segment field is 0.

It should be noted that, after the first communications device determines the position of the working channel of the BSS, the first communications device may separately determine the value of the current channel center frequency indicator 0, the value of the current channel center frequency indicator 1, the value of the current channel center frequency indicator 2, and the value of the current channel center frequency indicator 3 based on the quantity of frequency segments of the working bandwidth of the BSS and the center frequency of each frequency segment. The center frequency of the frequency segment and the current channel center frequency indicator may be determined by using a preset mapping relationship.

In a possible implementation of the third aspect or the fourth aspect, the first frame further includes a segment size field, and the segment size field is used to indicate a segment size of each of the N channel center frequency segment fields. For example, an EHT operation information field may further carry a segment size field, and the segment size field is used to indicate sizes of four frequency segments. In this case, each frequency segment may not be 80 MHz, but may be indicated by the segment size field. The segment size may be 20 MHZ, 40 MHZ, 80 MHz, or 160 MHZ. For another example, the segment size may be 20 MHZ, 40 MHZ, or 80 MHz. For another example, the segment size may be 40

MHz or 80 MHZ. For another example, the segment size may be 20 MHz or 80 MHZ. For another example, the segment size may be 80 MHz or 160 MHZ. The sizes of the four frequency segments may be the same or may be different.

In a possible implementation of the third aspect or the fourth aspect, when N is equal to 4, the N channel center frequency segment fields are a first channel center frequency segment field, a second channel center frequency segment field, a fifth channel center frequency segment field, and a sixth channel center frequency segment field. The first channel center frequency segment field and the second channel center frequency segment field are in a first operation element field. The fifth channel center frequency segment field and the sixth channel center frequency segment field are in a second operation element field. The first operation element field and the second operation element field are in the first frame.

In a possible implementation of the third aspect or the fourth aspect, the first channel center frequency segment field and the second channel center frequency segment field are used to indicate two frequency segments, in the second band, in which the BSS works. The fifth channel center frequency segment field and the sixth channel center frequency segment field are used to indicate two frequency segments, in the first band, in which the BSS works.

In a possible implementation of the third aspect or the fourth aspect, the first frame further includes the multi-band aggregation mode field. The fifth channel center frequency segment field and the sixth channel center frequency segment field are used to indicate two frequency segments, in the first band, in which the BSS works. The multi-band aggregation mode field is used to indicate bands to which frequency segments corresponding to the first channel center frequency segment field and the second channel center frequency segment field belong.

In a possible implementation of the third aspect or the fourth aspect, the fifth channel center frequency segment field is used to indicate a center frequency of an 80 MHz frequency segment in which the primary channel is located. The sixth channel center frequency segment field is used to: when the 80 MHz frequency segment in which the primary channel is located is in one contiguous 160 MHz frequency segment, indicate a center frequency of the contiguous 160 MHZ frequency segment in which the primary channel is located; or when the 80 MHz frequency segment in which the primary channel is located is not in one contiguous 160 MHz frequency segment, indicate a center frequency of a second 80 MHz frequency segment in addition to the 80 MHz frequency segment in which the primary channel is located. The first channel center frequency segment field is used to: when there is a third 80 MHz frequency segment in addition to the 80 MHz frequency segment in which the primary channel is located and the second 80 MHZ frequency segment, indicate a center frequency of the third 80 MHz frequency segment. The second channel center frequency segment field is used to: when the third 80 MHz frequency segment is in one contiguous 160 MHz frequency segment, indicate a center frequency of the contiguous 160 MHz frequency segment in which the third 80 MHz frequency segment falls; or when the third 80 MHz frequency segment is not in one contiguous 160 MHz frequency segment, and there is a fourth 80 MHz frequency segment in addition to the 80 MHz frequency segment in which the primary channel is located, the second 80 MHz frequency segment, and the third 80 MHz frequency segment, indicate a center frequency of the fourth 80 MHz frequency segment; or when there is a fourth 80 MHz frequency segment in addition to the 80 MHz frequency segment in which the primary channel is located, the second 80 MHz frequency segment, and the third 80 MHz frequency segment, indicate a center frequency of the fourth 80 MHz frequency segment.

In a possible implementation of the third aspect or the fourth aspect, the first frame further includes a first operating class field, and the first operating class field is used to indicate a starting frequency of the second band.

In a possible implementation of the third aspect or the fourth aspect, the first frame further includes a first channel center frequency segment field, a second channel center frequency segment field, and the multi-band aggregation mode field. The multi-band aggregation mode field is used to indicate a band to which a frequency segment corresponding to the second channel center frequency segment field belongs. The first channel center frequency segment field and the second channel center frequency segment field are used to indicate two frequency segments in which the BSS works.

In a possible implementation of the third aspect or the fourth aspect, the first frame further includes a channel bandwidth field, and the channel bandwidth field is used to indicate a BSS bandwidth. A length of the channel bandwidth field is one byte. When a value of the channel bandwidth field is 4, the channel bandwidth field is used to indicate that the BSS bandwidth is 320 MHz or 160+160 MHZ.

In a possible implementation of the third aspect or the fourth aspect, a value of the first channel center frequency segment field and a value of the second channel center frequency segment field are obtained by using a value of a current channel center frequency indicator 0 and a value of a current channel center frequency indicator 1.

In a possible implementation of the third aspect or the fourth aspect, when a position of a working channel of the BSS is the following frequency position: 320 MHZ, the value of the first channel center frequency segment field is the value of the current channel center frequency indicator 0 minus 16, and the value of the second channel center frequency segment field is the value of the current channel center frequency indicator 0 plus 16; or when a position of a working channel of the BSS is the following frequency position: 160+160 MHZ, the value of the first channel center frequency segment field is the value of the current channel center frequency indicator 0, and the value of the second channel center frequency segment field is the value of the current channel center frequency indicator 1.

In a possible implementation of the third aspect or the fourth aspect, when a position of a working channel of the BSS is the following frequency position: 320 MHZ, the value of the first channel center frequency segment field is the value of the current channel center frequency indicator 0 minus 16 or plus 16, and the value of the second channel center frequency segment field is the value of the current channel center frequency indicator 0; or when a position of a working channel of the BSS is the following frequency position: 160+160 MHZ, the value of the first channel center frequency segment field is the value of the current channel center frequency indicator 0, and the value of the second channel center frequency segment field is the value of the current channel center frequency indicator 1.

In a possible implementation of the third aspect or the fourth aspect, the first frame further includes a channel bandwidth field, and the channel bandwidth field is used to indicate a BSS bandwidth. A length of the channel bandwidth field is one byte. When a value of the channel bandwidth field is 4, the channel bandwidth field is used to indicate that the BSS bandwidth is 320 MHz; or when a value of the channel bandwidth field is 5, the channel bandwidth field is used to indicate that the BSS bandwidth is 160+160 MHZ; or when a value of the channel bandwidth field is 6, the channel bandwidth field is used to indicate that the BSS bandwidth is 240+80 MHZ; or when a value of the channel bandwidth field is 7, the channel bandwidth field is used to indicate that the BSS bandwidth is 80+240 MHZ; or when a value of the channel bandwidth field is 8, the channel bandwidth field is used to indicate that the BSS bandwidth is 240 MHZ; or when a value of the channel bandwidth field is 9, the channel bandwidth field is used to indicate that the BSS bandwidth is 160+80 MHz; or when a value of the channel bandwidth field is 10, the channel bandwidth field is used to indicate that the BSS bandwidth is 80+160 MHZ.

In a possible implementation of the third aspect or the fourth aspect, when a position of a working channel of the BSS is the following frequency position: 320 MHZ, the value of the first channel center frequency segment field is the value of the current channel center frequency indicator 0 minus 16, and the value of the second channel center frequency segment field is the value of the current channel center frequency indicator 0 plus 16; or when a position of a working channel of the BSS is the following frequency position: 160+160 MHZ, the value of the first channel center frequency segment field is the value of the current channel center frequency indicator 0, and the value of the second channel center frequency segment field is the value of the current channel center frequency indicator 1; or when a position of a working channel of the BSS is the following frequency position: 240+80 MHZ, the value of the first channel center frequency segment field is the value of the current channel center frequency indicator 0, and the value of the second channel center frequency segment field is the value of the current channel center frequency indicator 1; or when a position of a working channel of the BSS is the following frequency position: 80+240 MHZ, the value of the first channel center frequency segment field is the value of the current channel center frequency indicator 0, and the value of the second channel center frequency segment field is the value of the current channel center frequency indicator 1; or when a position of a working channel of the BSS is the following frequency position: 240 MHZ, the value of the first channel center frequency segment field is the value of the current channel center frequency indicator 0 minus 12, and the value of the second channel center frequency segment field is the value of the current channel center frequency indicator (plus 12; or when a position of a working channel of the BSS is the following frequency position: 160+80 MHZ, the value of the first channel center frequency segment field is the value of the current channel center frequency indicator 0, and the value of the second channel center frequency segment field is the value of the current channel center frequency indicator 1; or when a position of a working channel of the BSS is the following frequency position: 80+160 MHZ, the value of the first channel center frequency segment field is the value of the current channel center frequency indicator 0, and the value of the second channel center frequency segment field is the value of the current channel center frequency indicator 1.

In a possible implementation of the third aspect or the fourth aspect, the first channel center frequency segment field and the second channel center frequency segment field are two contiguous frequency segments; and when a position of a working channel of the BSS is the following frequency position: 320 MHZ, the value of the first channel center frequency segment field is the value of the current channel center frequency indicator 0 plus 16 or minus 16, and the value of the second channel center frequency segment field is the value of the current channel center frequency indicator 0; or when a position of a working channel of the BSS is the following frequency position: 160+160 MHZ, the value of the first channel center frequency segment field is the value of the current channel center frequency indicator 0, and the value of the second channel center frequency segment field is the value of the current channel center frequency indicator 1; or when a position of a working channel of the BSS is the following frequency position: 240+80 MHZ, the value of the first channel center frequency segment field is the value of the current channel center frequency indicator 0, and the value of the second channel center frequency segment field is the value of the current channel center frequency indicator 1; or when a position of a working channel of the BSS is the following frequency position: 80+240 MHz, the value of the first channel center frequency segment field is the value of the current channel center frequency indicator 0, and the value of the second channel center frequency segment field is the value of the current channel center frequency indicator 1; or when a position of a working channel of the BSS is the following frequency position: 240 MHZ, the value of the first channel center frequency segment field is the value of the current channel center frequency indicator 0 minus 12 or plus 12, and the value of the second channel center frequency segment field is the value of the current channel center frequency indicator 0; or when a position of a working channel of the BSS is the following frequency position: 160+80 MHZ, the value of the first channel center frequency segment field is the value of the current channel center frequency indicator 0, and the value of the second channel center frequency segment field is the value of the current channel center frequency indicator 1; or when a position of a working channel of the BSS is the following frequency position: 80+160 MHZ, the value of the first channel center frequency segment field is the value of the current channel center frequency indicator 0, and the value of the second channel center frequency segment field is the value of the current channel center frequency indicator 1.

In a possible implementation of the third aspect or the fourth aspect, the first frame further includes a first channel center frequency segment field, a second channel center frequency segment field, a third operating class field, a third channel center frequency segment field, and a fourth channel center frequency segment field. The first operating class field is used to indicate that the first channel center frequency segment field and the second channel center frequency segment field belong to the second band. The first channel center frequency segment field and the second channel center frequency segment field are used to indicate two frequency segments, in the second band, in which the BSS works. The third operating class field is used to indicate that the third channel center frequency segment field and the fourth channel center frequency segment field belong to the first band. The third channel center frequency segment field and the fourth channel center frequency segment field are used to indicate two frequency segments, in the first band, in which the BSS works.

In a possible implementation of the third aspect or the fourth aspect, the first frame further includes a first channel center frequency segment field, a second channel center frequency segment field, a third channel center frequency segment field, and the multi-band aggregation mode field. The multi frequency-band aggregation mode field is used to indicate bands to which frequency segments corresponding to the second channel center frequency segment field and the third channel center frequency segment field belong. The first channel center frequency segment field, the second channel center frequency segment field, and the third channel center frequency segment field are used to indicate three frequency segments in which the BSS works.

In a possible implementation of the third aspect or the fourth aspect, the first frame further includes a channel bandwidth field, and the channel bandwidth field is used to indicate a BSS bandwidth. A length of the channel bandwidth field is one byte. When a value of the channel bandwidth field is 4, the channel bandwidth field is used to indicate that the BSS bandwidth is 320 MHz, 160+160 MHz, 80+80+160 MHZ, 80+240 MHz, or 80+160 MHZ.

In a possible implementation of the third aspect or the fourth aspect, a value of the first channel center frequency segment field and a value of the second channel center frequency segment field are obtained by using a value of a current channel center frequency indicator 0, a value of a current channel center frequency indicator 1, and a value of the current channel center frequency indicator 2.

In a possible implementation of the third aspect or the fourth aspect, when a position of a working channel of the BSS is the following frequency position: 320 MHZ, the value of the first channel center frequency segment field is the value of the current channel center frequency indicator 0 minus 24, the value of the second channel center frequency segment field is the value of the current channel center frequency indicator 0 minus 8, and the value of the third channel center frequency segment field is the value of the current channel center frequency indicator 0 plus 16; or when a position of a working channel of the BSS is the following frequency position: 160+160 MHZ, the value of the first channel center frequency segment field is the value of the current channel center frequency indicator 0 minus 8, the value of the second channel center frequency segment field is the value of the current channel center frequency indicator 0 plus 8, and the value of the third channel center frequency segment field is the value of the current channel center frequency indicator 1; or when a position of a working channel of the BSS is the following frequency position: 80+80+160 MHz, the value of the first channel center frequency segment field is the value of the current channel center frequency indicator 0, the value of the second channel center frequency segment field is the value of the current channel center frequency indicator 1, and the value of the third channel center frequency segment field is the value of the current channel center frequency indicator 2; or when a position of a working channel of the BSS is the following frequency position: 80+240 MHZ, the value of the first channel center frequency segment field is the value of the current channel center frequency indicator 0, the value of the second channel center frequency segment field is the value of the current channel center frequency indicator 1 minus 16, and the value of the third channel center frequency segment field is the value of the current channel center frequency indicator 1 plus 8; or when a position of a working channel of the BSS is the following frequency position: 80+160 MHZ, the value of the first channel center frequency segment field is the value of the current channel center frequency indicator 0, the value of the second channel center frequency segment field is 0, and the value of the third channel center frequency segment field is the value of the current channel center frequency indicator 1.

In a possible implementation of the third aspect or the fourth aspect, the first frame further includes a segment size field, and the segment size field is used to indicate a segment size of each of the first channel center frequency segment field, the second channel center frequency segment field, and the third channel center frequency segment field.

In a possible implementation of the third aspect or the fourth aspect, a length of the channel bandwidth field is one byte. When a value of the channel bandwidth field is 4, the channel bandwidth field is used to indicate that the BSS bandwidth is 320 MHZ; or when a value of the channel bandwidth field is 5, the channel bandwidth field is used to indicate that the BSS bandwidth is 160+160 MHZ; or when a value of the channel bandwidth field is 6, the channel bandwidth field is used to indicate that the BSS bandwidth is 80+80+160 MHZ; or when a value of the channel bandwidth field is 7, the channel bandwidth field is used to indicate that the BSS bandwidth is 80+240 MHZ; or when a value of the channel bandwidth field is 8, the channel bandwidth field is used to indicate that the BSS bandwidth is 240 MHZ; or when a value of the channel bandwidth field is 9, the channel bandwidth field is used to indicate that the BSS bandwidth is 80+160 MHZ; or when a value of the channel bandwidth field is 10, the channel bandwidth field is used to indicate that the BSS bandwidth is 160+80 MHz; or when a value of the channel bandwidth field is 11, the channel bandwidth field is used to indicate that the BSS bandwidth is 80+80+80 MHz.

In a possible implementation of the third aspect or the fourth aspect, when a position of a working channel of the BSS is the following frequency position: 320 MHZ, the value of the first channel center frequency segment field is the value of the current channel center frequency indicator 0 minus 24, the value of the second channel center frequency segment field is the value of the current channel center frequency indicator 0 minus 8, and the value of the third channel center frequency segment field is the value of the current channel center frequency indicator 0 plus 16; or when a position of a working channel of the BSS is the following frequency position: 160+160 MHz, the value of the first channel center frequency segment field is the value of the current channel center frequency indicator 0 minus 8, the value of the second channel center frequency segment field is the value of the current channel center frequency indicator 0 plus 8, and the value of the third channel center frequency segment field is the value of the current channel center frequency indicator 1; or when a position of a working channel of the BSS is the following frequency position: 80+80+160 MHz, the value of the first channel center frequency segment field is the value of the current channel center frequency indicator 0, the value of the second channel center frequency segment field is the value of the current channel center frequency indicator 1, and the value of the third channel center frequency segment field is the value of the current channel center frequency indicator 2; or when a position of a working channel of the BSS is the following frequency position: 80+240 MHz, the value of the first channel center frequency segment field is the value of the current channel center frequency indicator 0, the value of the second channel center frequency segment field is the value of the current channel center frequency indicator 1 minus 16, and the value of the third channel center frequency segment field is the value of the current channel center frequency indicator 1 plus 8; or when a position of a working channel of the BSS is the following frequency position: 240 MHz, the value of the first channel center frequency segment field is the value of the current channel center frequency indicator 0 minus 16, the value of the second channel center frequency segment field is the value of the current channel center frequency indicator 0, and the value of the third channel center frequency segment field is the value of the current channel center frequency indicator 0 plus 16; or when a position of a working channel of the BSS is the following frequency position: 160+80 MHz, the value of the first channel center frequency segment field is the value of the current channel center frequency indicator 0 minus 8, the value of the second channel center frequency segment field is the value of the current channel center frequency indicator 0 plus 8, and the value of the third channel center frequency segment field is the value of the current channel center frequency indicator 1; or when a position of a working channel of the BSS is the following frequency position: 80+160 MHz, the value of the first channel center frequency segment field is the value of the current channel center frequency indicator 0, the value of the second channel center frequency segment field is the value of the current channel center frequency indicator 1 minus 8, and the value of the third channel center frequency segment field is the value of the current channel center frequency indicator 1 plus 8; or when a position of a working channel of the BSS is the following frequency position: 80+80+80 MHz, the value of the first channel center frequency segment field is the value of the current channel center frequency indicator 0, the value of the second channel center frequency segment field is the value of the current channel center frequency indicator 1, and the value of the third channel center frequency segment field is the value of the current channel center frequency indicator 2.

In a possible implementation of the third aspect or the fourth aspect, the first frame further includes a first channel center frequency segment field, a fifth channel center frequency segment field, and a sixth channel center frequency segment field. The first channel center frequency segment field is in a first operation element field. The fifth channel center frequency segment field and the sixth channel center frequency segment field are in a second operation element field. The first operation element field and the second operation element field are in the first frame.

In a possible implementation of the third aspect or the fourth aspect, the first channel center frequency segment field is used to indicate one frequency segment, in the second band, in which the BSS works. The fifth channel center frequency segment field and the sixth channel center frequency segment field are used to indicate two frequency segments, in the first band, in which the BSS works.

In a possible implementation of the third aspect or the fourth aspect, the first frame further includes the multi-band aggregation mode field. The fifth channel center frequency segment field and the sixth channel center frequency segment field are used to indicate two frequency segments, in the first band, in which the BSS works. The multi-band aggregation mode field is used to indicate a band to which a frequency segment corresponding to the first channel center frequency segment field belongs.

In a possible implementation of the third aspect or the fourth aspect, the fifth channel center frequency segment field is used to indicate a center frequency of an 80 MHz frequency segment in which the primary channel is located. The sixth channel center frequency segment field is used to: when the 80 MHz frequency segment in which the primary channel is located is in one contiguous 160 MHz frequency segment, indicate a center frequency of the contiguous 160 MHZ frequency segment; or when the 80 MHz frequency segment in which the primary channel is located is not in one contiguous 160 MHz frequency segment, indicate a center frequency of a second 80 MHz frequency segment in addition to the 80 MHz frequency segment in which the primary channel is located. The first channel center frequency segment field is used to: when the BSS bandwidth is 320 MHZ, 160+160 MHZ, 80+80+160 MHz, or 80+240 MHZ, indicate a center frequency of a last contiguous 160 MHz frequency segment in addition to the contiguous 160 MHZ frequency segment; or when the BSS bandwidth is 240 MHZ, 80+160 MHZ, 160+80 MHZ, or 80+80+80 MHZ, indicate a center frequency of a last 80 MHz frequency segment.

According to a fifth aspect, a communications device is provided, configured to perform the method in the first aspect or any possible implementation of the first aspect. Specifically, the communications device includes units configured to perform the method in the first aspect or any possible implementation of the first aspect.

According to a sixth aspect, another communications device is provided, configured to perform the method in the second aspect or any possible implementation of the second aspect. Specifically, the communications device includes units configured to perform the method in the second aspect or any possible implementation of the second aspect.

According to a seventh aspect, a communications device is provided, configured to perform the method in the third aspect or any possible implementation of the third aspect. Specifically, the communications device includes units configured to perform the method in the third aspect or any possible implementation of the third aspect.

According to an eighth aspect, another communications device is provided, configured to perform the method in the fourth aspect or any possible implementation of the fourth aspect. Specifically, the communications device includes units configured to perform the method in the fourth aspect or any possible implementation of the fourth aspect.

According to a ninth aspect, a communications device is provided. The communications device includes a processor and a transceiver, and optionally, further includes a memory. The processor, the transceiver, and the memory communicate with each other through an internal connection path. The processor is configured to perform the method in the first aspect or any possible implementation of the first aspect. The transceiver is controlled by the processor to perform signal receiving and sending in the method in the first aspect or any possible implementation of the first aspect. The memory is configured to store instructions, and the instructions are invoked by the processor to perform the method in the first aspect or any possible implementation of the first aspect.

According to a tenth aspect, a communications device is provided. The communications device includes a processor and a transceiver, and optionally, further includes a memory: The processor, the transceiver, and the memory communicate with each other through an internal connection path. The processor is configured to perform the method in the second aspect or any possible implementation of the second aspect. The transceiver is controlled by the processor to perform signal receiving and sending in the method in the second aspect or any possible implementation of the second aspect. The memory is configured to store instructions, and the instructions are invoked by the processor to perform the method in the second aspect or any possible implementation of the second aspect.

According to an eleventh aspect, a communications device is provided. The communications device includes a processor and a transceiver, and optionally, further includes a memory: The processor, the transceiver, and the memory communicate with each other through an internal connection path. The processor is configured to perform the method in the third aspect or any possible implementation of the third aspect. The transceiver is controlled by the processor to perform signal receiving and sending in the method in the third aspect or any possible implementation of the third aspect. The memory is configured to store instructions, and the instructions are invoked by the processor to perform the method in the third aspect or any possible implementation of the third aspect.

According to a twelfth aspect, a communications device is provided. The communications device includes a processor and a transceiver, and optionally, further includes a memory: The processor, the transceiver, and the memory communicate with each other through an internal connection path. The processor is configured to perform the method in the fourth aspect or any possible implementation of the fourth aspect. The transceiver is controlled by the processor to perform signal receiving and sending in the method in the fourth aspect or any possible implementation of the fourth aspect. The memory is configured to store instructions, and the instructions are invoked by the processor to perform the method in the fourth aspect or any possible implementation of the fourth aspect.

According to a thirteenth aspect, a computer-readable storage medium is provided, configured to store a computer program. The computer program includes instructions for performing the method in the first aspect or any possible implementation of the first aspect.

According to a fourteenth aspect, a computer-readable storage medium is provided, configured to store a computer program. The computer program includes instructions for performing the method in the second aspect or any possible implementation of the second aspect.

According to a fifteenth aspect, a computer-readable storage medium is provided, configured to store a computer program. The computer program includes instructions for performing the method in the third aspect or any possible implementation of the third aspect.

According to a sixteenth aspect, a computer-readable storage medium is provided, configured to store a computer program. The computer program includes instructions for performing the method in the fourth aspect or any possible implementation of the fourth aspect.

According to a seventeenth aspect, a computer program is provided. The computer program includes instructions for performing the method in the first aspect or any possible implementation of the first aspect.

According to an eighteenth aspect, a computer program is provided. The computer program includes instructions for performing the method in the second aspect or any possible implementation of the second aspect.

According to a nineteenth aspect, a computer program is provided. The computer program includes instructions for performing the method in the third aspect or any possible implementation of the third aspect.

According to a twentieth aspect, a computer program is provided. The computer program includes instructions for performing the method in the fourth aspect or any possible implementation of the fourth aspect.

According to a twenty-first aspect, a chip is provided. The chip includes a processing circuit and a transceiver pin, and optionally; further includes a memory. The processing circuit, the transceiver pin, and the memory communicate with each other through an internal connection path. The processing circuit is configured to perform the method in the first aspect or any possible implementation of the first aspect. The transceiver pin is controlled by the processing circuit to perform signal receiving and sending in the method in the first aspect or any possible implementation of the first aspect. The memory is configured to store instructions. The instructions are invoked by the processing circuit to perform the method in the first aspect or any possible implementation of the first aspect.

According to a twenty-second aspect, a chip is provided. The chip includes a processing circuit and a transceiver pin, and optionally, further includes a memory. The processing circuit, the transceiver pin, and the memory communicate with each other through an internal connection path. The processing circuit is configured to perform the method in the second aspect or any possible implementation of the second aspect. The transceiver pin is controlled by the processing circuit to perform signal receiving and sending in the method in the second aspect or any possible implementation of the second aspect. The memory is configured to store instructions. The instructions are invoked by the processing circuit to perform the method in the second aspect or any possible implementation of the second aspect.

According to a twenty-third aspect, a chip is provided. The chip includes a processing circuit and a transceiver pin, and optionally, further includes a memory. The processing circuit, the transceiver pin, and the memory communicate with each other through an internal connection path. The processing circuit is configured to perform the method in the third aspect or any possible implementation of the third aspect. The transceiver pin is controlled by the processing circuit to perform signal receiving and sending in the method in the third aspect or any possible implementation of the third aspect. The memory is configured to store instructions. The instructions are invoked by the processing circuit to perform the method in the third aspect or any possible implementation of the third aspect.

According to a twenty-fourth aspect, a chip is provided. The chip includes a processing circuit and a transceiver pin, and optionally, further includes a memory. The processing circuit, the transceiver pin, and the memory communicate with each other through an internal connection path. The processing circuit is configured to perform the method in the fourth aspect or any possible implementation of the fourth aspect. The transceiver pin is controlled by the processing circuit to perform signal receiving and sending in the method in the fourth aspect or any possible implementation of the fourth aspect. The memory is configured to store instructions. The instructions are invoked by the processing circuit to perform the method in the fourth aspect or any possible implementation of the fourth aspect.

DESCRIPTION OF EMBODIMENTS

Embodiments of this application provide a multi-band indication method and a communications device, to implement band indication in a multi-band aggregation scenario and improve resource utilization efficiency.

The following describes the embodiments of this application with reference to the accompanying drawings.

In this specification, claims, and the accompanying drawings of this application, the terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in the embodiments of this application. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, system, product, or device.

Figure 1:
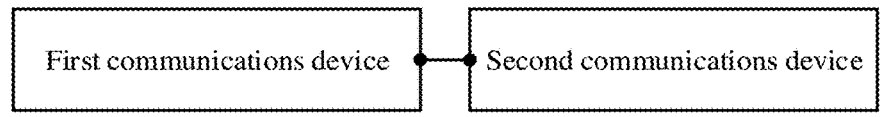
FIG. 1 is a schematic diagram of a system architecture to which a multi-band indication method is applied according to an embodiment of this application.

The technical solutions in the embodiments of this application may be applied to a communications system. As shown in FIG. 1, the communications system provided in the embodiments of this application may include at least two communications devices: a first communications device and a second communications device. The first communications device may be a network device, and the network device may specifically include an access point (access point, AP). The second communications device may be a terminal device, and the terminal device may specifically include a station (station, STA). Alternatively, the first communications device may be a terminal device, and the second communications device may be a network device. Alternatively, the first communications device may be a network device, and the second communications device may be another network device. Alternatively, the first communications device may be a terminal device, and the second communications device may be another terminal device. A specific implementation of the communications device may be flexibly selected with reference to an actual application scenario. This is not limited herein.

The technical solutions in the embodiments of this application may be applied to various communications systems for data processing, for example, a code division multiple access (code division multiple access, CDMA) system, a time division multiple access (time division multiple access, TDMA) system, a frequency division multiple access (frequency division multiple access, FDMA) system, an orthogonal frequency division multiple access (orthogonal frequency division multiple access, OFDMA) system, a single carrier frequency division multiple access (single carrier FDMA, SC-FDMA) system, and another system. Terms "system" and "network" can be interchanged with each other. The CDMA system may implement radio technologies such as universal terrestrial radio access (universal terrestrial radio access, UTRA) and CDMA2000. UTRA may include a wideband CDMA (wideband CDMA, WCDMA) technology and other variant technologies of CDMA. CDMA2000 may cover interim standard (interim standard, IS) 2000 (IS-2000), IS-95, and IS-856. The TDMA system may implement radio technologies such as a global system for mobile communications (global system for mobile communications, GSM). The OFDMA system may implement radio technologies such as evolved universal terrestrial radio access (evolved UTRA, E-UTRA), ultra mobile broadband (ultra mobile broadband, UMB), IEEE 802.11 (Wi-Fi), IEEE 802.16 (WiMAX), IEEE 802.20, and Flash OFDMA. UTRA corresponds to a UMTS, and E-UTRA corresponds to an evolved version of the UMTS. 3GPP long term evolution (long term evolution, LTE) and various versions evolved based on LTE are redactions using E-UTRA UMTS. A 5th generation (5 Generation, "5G" for short) communications system or new radio (New Radio, "NR" for short) is a next-generation communications system under research. In addition, the communications systems may be further applied to future-oriented communications technologies, which are all applicable to the technical solutions provided in the embodiments of this application. A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of network architectures and emergence of new service scenarios, the technical solutions provided in the embodiments of this application can also be applied to similar technical problems.

Figure 2:
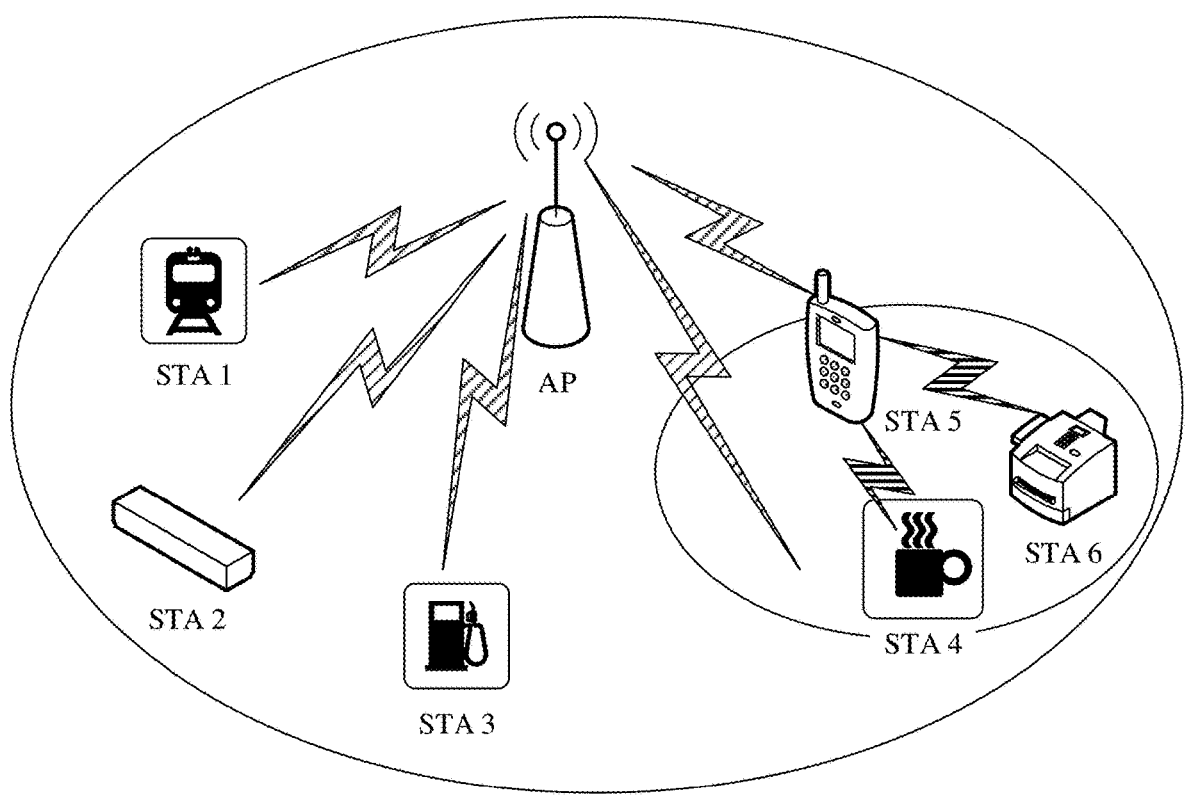
FIG. 2 is a schematic diagram of another system architecture to which a multi-band indication method is applied according to an embodiment of this application.

FIG. 2 is a schematic structural diagram of a possible radio access network (radio access network, RAN for short) according to an embodiment of this application. The RAN may be a base station access system of a 2G network (to be specific, the RAN includes a base station and a base station controller), may be a base station access system of a 3G network (to be specific, the RAN includes a base station and an RNC), may be a base station access system of a 4G network (to be specific, the RAN includes an eNB and an RNC), or may be a base station access system of a 5G network.

The first communications device provided in the embodiments of this application may be one or more network devices. In FIG. 2, an example in which the network device is specifically an AP is used. The second communications device provided in the embodiments of this application may be one or more terminal devices. In FIG. 2, an example in which the terminal device is specifically a STA is used. The network device may be any device with a wireless transceiver function, or a chip disposed in a device with a wireless transceiver function. The network device includes but is not limited to a base station (for example, a base station BS, a NodeB NodeB, an evolved NodeB eNodeB or eNB, a gNodeB gNodeB or gNB in a 5th generation 5G communications system, a base station in a future communications system, an access node in a Wi-Fi system, a wireless relay node, or a wireless backhaul node) and the like. The base station may be a macro base station, a micro base station, a picocell base station, a small cell, a relay station, or the like. A plurality of base stations may support a network using one or more of the foregoing technologies, or a future evolved network. The core network may support a network using one or more of the foregoing technologies, or a future evolved network. The base station may include one or more co-site or non-co-site transmission reception points (transmission reception point, TRP). The network device may alternatively be a radio controller, a centralized unit (centralized unit, CU), or a distributed unit (distributed unit, DU) in a cloud radio access network (cloud radio access network, CRAN) scenario. The network device may alternatively be a server, a wearable device, a vehicle-mounted device, or the like. An example in which the network device is a base station is used for description below: The plurality of network devices may be base stations of a same type or base stations of different types. The base station may communicate with terminal devices 1 to 6, or may communicate with the terminal devices 1 to 6 through a relay station. The terminal devices 1 to 6 may support communication with a plurality of base stations using different technologies. For example, the terminal devices may support communication with a base station supporting an LTE network, may support communication with a base station supporting a 5G network, or may support a dual connection to a base station in an LTE network and a base station in a 5G network. For example, the terminal is connected to a radio access network (radio access network, RAN) node of a wireless network. Currently, for example, the RAN node is a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), or a wireless fidelity (wireless fidelity, Wi-Fi) access point (access point, AP). In a network structure, the network device may include a centralized unit (centralized unit, CU) node, a distributed unit (distributed unit, DU) node, or a RAN device including a CU node and a DU node.

The terminal devices 1 to 6 each are also referred to as user equipment (user equipment, UE), a mobile station (mobile station, MS), a mobile terminal (mobile terminal, MT), a terminal, or the like, and is a device that provides voice and/or data connectivity for a user, or is a chip disposed in the device, for example, a handheld device or a vehicle-mounted device with a wireless connection function. Currently, for example, the terminal device is a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self-driving (self-driving), a wireless terminal in remote medical surgery (remote medical surgery), a wireless terminal in smart grid (smart grid), a wireless terminal in transportation safety (transportation safety), a wireless terminal in smart city (smart city), or a wireless terminal in smart home (smart home).

In the embodiments of this application, the AP and the STA 1 to the STA 6 form a communications system. In the communications system, the AP sends one or more of system information, an RAR message, or a paging message to one or more of the STA 1 to the STA 6. In addition, the STA 4 to the STA 6 also form a communications system. In the communications system, the STA 5 may function as a base station, and the STA 5 may send one or more of system information, control information, and a paging message to one or more of the STA 4 and the STA 6.

The communications system provided in the embodiments of this application may use a plurality of Wi-Fi standards. For example, a current Wi-Fi standard may be high throughput (high-throughput, HT), very high throughput (very high throughput, VHT), or high efficiency (high efficiency, HE). A next-generation Wi-Fi standard may be extremely high throughput (Extremely high throughput, EHT) or very high efficiency (very high efficiency; VHE). In a subsequent embodiment, an example in which the next-generation Wi-Fi standard is the EHT is used. For example, in the subsequent embodiment, a first frame includes an EHT operation element, and for another example, the first frame includes a VHE operation element. This is merely described herein, and is not intended to limit the embodiments of this application.

In the embodiments of this application, the first communications device and the second communications device associated with the first communications device may be multi-band devices. The multi-band device has a capability of performing communication in a plurality of bands. For example, for Wi-Fi communication, the plurality of bands may be lower than 1 GHZ, 2.4 GHz, 4.9 GHZ, 5 GHZ, 6 GHZ, or 60 GHz. When a device is equipped with a plurality of pieces of radio (radio), spectrum resources of a plurality of bands may be simultaneously used for data transmission. Particularly, when the device has a high-bandwidth transmission capability; spectrum resources of a plurality of bands (generally two adjacent bands) may be aggregated at the same time for transmission. A range of the band is greater than that of a frequency segment. For example, 2.4 GHZ, 5 GHZ, 6 GHZ, and 60 GHz are different bands, and a bandwidth range of the band is usually in a unit of MHZ, or even GHz. The first communications device and the second communications device associated with the first communications device form a basic service set (basic service set, BSS). In the embodiments of this application, a single BSS may perform transmission through multi-band aggregation. When a BSS works in a band, the band includes a primary channel (for example, 20 MHZ), and may further include a plurality of secondary channels. For example, the BSS simultaneously works in a first band and a second band. The first band is a band that includes a primary channel, and the second band is a band that does not include the primary channel. In addition to the primary channel, the first band may further include a secondary channel. However, the second band includes the secondary channel but does not include the primary channel.

Figure 3:
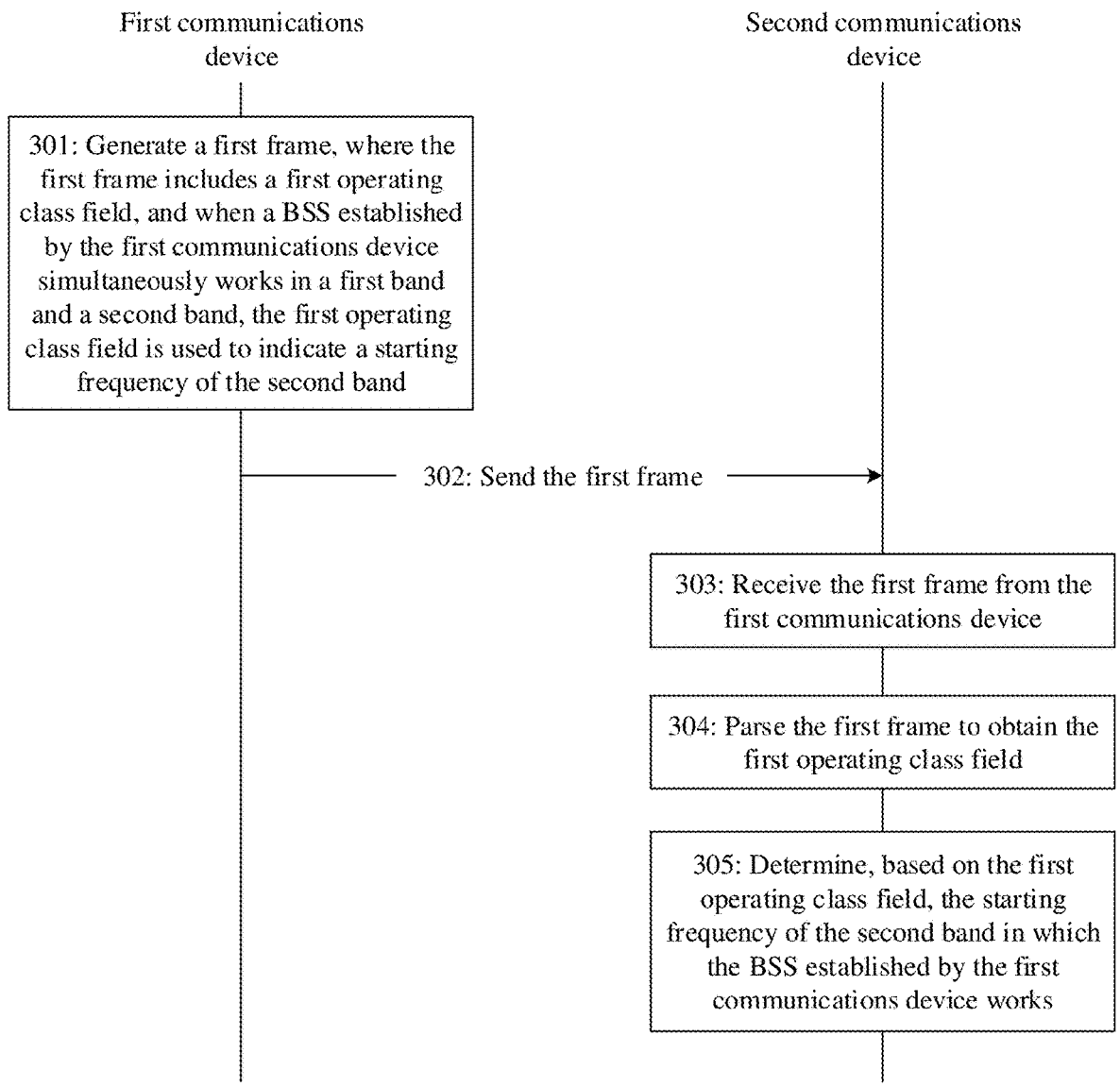
FIG. 3 is a schematic flowchart of interaction between a terminal device and a network device according to an embodiment of this application.

In the embodiments of this application, when the first communications device and the second communications device support a plurality of bands, a detailed implementation solution is provided for how to indicate the second band. FIG. 3 is a schematic flowchart of interaction between two communications devices according to an embodiment of this application. The multi-band indication method provided in the embodiments of this application mainly includes the following steps.

301: A first communications device generates a first frame, where the first frame includes a first operating class (operating class) field, and when a BSS established by the first communications device simultaneously works in a first band and a second band, the first operating class field is used to indicate a starting frequency of the second band, where the first band is a band that includes a primary channel, and the second band is a band that does not include the primary channel.

In some embodiments, when establishing the BSS, the first communications device indicates, in the first frame, a plurality of bands in which the BSS works. For example, a band (that is, the second band) that does not include the primary channel to be indicated in the first frame. For example, the first communications device may indicate the band in an operating class field in the first frame. For example, the first frame includes the first operating class field, and the first operating class field is used to indicate the starting frequency of the second band. Therefore, after receiving the first operating class field in the first frame, a second communications device may determine the starting frequency of the second band based on the first operating class field.

In some embodiments, the first frame generated by the first communications device may specifically include a management frame. For example, the first frame may be specifically a beacon (beacon) frame, or the first frame is another management frame. For example, the first frame may be specifically an association response frame. A specific implementation of the first frame may be determined with reference to an application scenario.

In some embodiments of this application, a band in which the primary channel is located may be determined as the first band. In some other embodiments, the first frame further includes a second operating class field. To be specific, the first frame includes two operating class fields, the first operating class field is used to indicate the starting frequency of the second band, and the second operating class field is used to indicate a starting frequency of the first band. Therefore, after receiving the second operating class field in the first frame, the second communications device may determine the starting frequency of the first band based on the second operating class field.

In some embodiments of this application, the first frame further includes a band identifier field (Band ID), and the band identifier field is used to identify the second band. Therefore, after receiving the band identifier field in the first frame, the second communications device may identify the second band based on the band identifier field.

In some embodiments of this application, the first operating class field is in a first operation information (operation information) field. The first operation information field is in a first operation element (operation element) field. The first operation element field is in the first frame.

The first frame may include an operation element field, the operation element field may include an operation information field, and the operation information field may include an operating class field. In addition, each generation of standard is compatible with previous generations of standards. Therefore, previous generations of designs of operation information are considered in a new generation of design of operation information.

For example, a next-generation Wi-Fi standard is EHT, and a maximum bandwidth of the EHT is to be extended. For example, the maximum bandwidth may be extended to 240 MHZ or 320 MHz. Therefore, a new frame structure format is designed for the first frame after the bandwidth is extended. In some embodiments, the first communications device may generate the first frame. The first frame may include the first operating class field, and the first operating class field is used to indicate the starting frequency of the second band.

In some embodiments of this application, when a value of the first operating class field is a preset value, the first operating class field is used to indicate that the BSS works in the first band, and the BSS does not support the second band.

The first operating class field in the first frame may be an operating class field in a management frame. When the operating class field is a special value (for example, 0 or 255), it indicates that the second band does not exist, the BSS works in the first band, and the BSS does not support the second band. In other words, the first communications device uses the first band for communication, and the first communications device does not support the second band.

302: The first communications device sends the first frame.

In some embodiments, after the first communications device generates the foregoing first frame, the first communications device may send the first frame over a communications network. For example, if the first communications device and the second communications device are in a same communications network, the first communications device may send the first frame to the second communications device. For a description of a frame structure of the first frame, refer to the detailed description of the foregoing content.

For example, the first frame may be a beacon frame that is periodically sent by an AP. The beacon frame is used to indicate the starting frequency of the second band in which the BSS works, so that a station that receives the beacon frame is enabled to know the starting frequency of the second band in which the BSS works. A downlink data frame or an uplink data frame is sent between the AP and the STA in a time division manner through contention between two adjacent beacon frames. The data frame may be sent by using a band that is not greater than the first band and the second band that are supported by the BSS. In addition to being indicated by using the beacon frame, the starting frequency of the second band may be sent by using another management frame, for example, an association response frame.

303: The second communications device receives the first frame from the first communications device.

In some embodiments, the first communications device and the second communications device are in a same communications network. The first communications device may send the first frame to the second communications device, and the second communications device may receive the first frame over the communications network.

The first frame received by the second communications device may specifically include a management frame. For example, the first frame may be specifically a beacon frame, or the first frame is another management frame. For example, the first frame may be specifically an association response frame. A specific implementation of the first frame may be determined with reference to an application scenario.

304: The second communications device parses the first frame to obtain the first operating class field.

After generating the first frame, the first communications device sends the first frame to the second communications device. After receiving the first frame, the second communications device may parse the first frame in a preconfigured frame structure parsing manner to obtain the first operating class field, and obtain the value of the first operating class field.

305: The second communications device determines, based on the first operating class field, the starting frequency of the second band in which the BSS established by the first communications device works, where the BSS simultaneously works in the first band and the second band, the first band is the band that includes the primary channel, and the second band is the band that does not include the primary channel.

In some embodiments, after determining the first operating class field, the second communications device obtains the value of the first operating class field, and the second communications device determines, based on the first operating class field, the starting frequency of the second band in which the BSS works. Therefore, the second communications device may determine a plurality of bands used by the first communications device, to perform multi-band aggregation transmission.

It can be learned from the example description of some embodiments that the first frame generated by the first communications device includes the first operating class field, and the first operating class field is used to indicate the starting frequency of the second band. The first communications device sends the first frame to the second communications device. Therefore, the second communications device may obtain the first operating class field based on the received first frame, and may determine the starting frequency of the second band by parsing the first operating class field. Therefore, in some embodiments, band indication can be implemented in a multi-band aggregation scenario, and resource utilization efficiency can be improved.

The method procedure shown in FIG. 3 is described below by using a specific scenario as an example.

In some embodiments, for an EHT BSS having a multi-band aggregation communication function, a working bandwidth may be indicated in the following manner. For example, starting frequencies (starting frequency) of two bands (a first band and a second band) are indicated. In some embodiments, channels of two bands may be simultaneously used for transmission. For example, bands of 5 GHZ and 6 GHz are simultaneously used for transmission, and 5 GHZ and 6 GHz are two different bands. For example, the first band may be a 5 GHz band, and the 5 GHz band includes a primary channel. The second band may be a 6 GHZ band, and the 6 GHz band does not include the primary channel. For another example, the first band may be a 6 GHz band, and the 6 GHz band includes a primary channel. The second band may be a 5 GHZ band, and the 5 GHz band does not include the primary channel.

Figure 4:
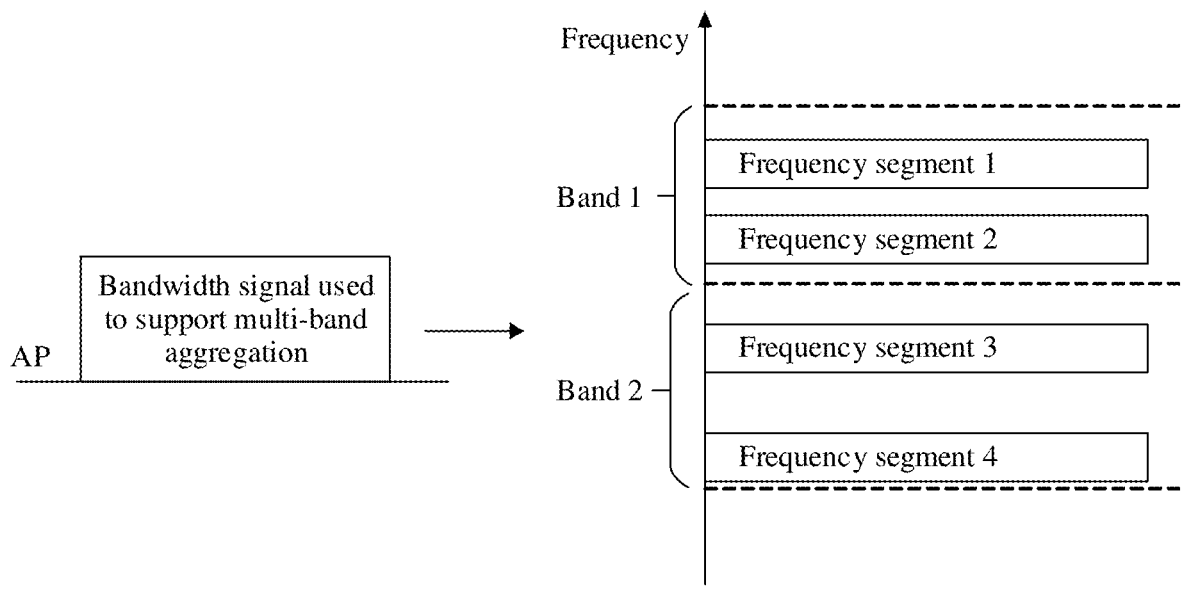
FIG. 4 is a schematic diagram of sending bandwidth indication information by an AP according to an embodiment of this application.

In some embodiments, the first communications device may indicate the starting frequency of the second band in the EHT operation element. FIG. 4 is a schematic diagram of sending bandwidth indication information by an AP according to an embodiment of this application. The AP sends the bandwidth indication information, and the bandwidth indication information may be specifically a bandwidth signal used to support a multi-band aggregation mode (bandwidth signaling for multi-band aggregation mode). A BSS established by the AP may simultaneously work in a band 1 and a band 2. The band 1 may include a frequency segment 1 and a frequency segment 2, and the band 2 may include a frequency segment 3 and a frequency segment 4. Using an example in which the frequency segment 1 is a primary channel, the bandwidth signal used to support multi-band aggregation may be used to indicate a starting frequency of the band 2, and/or indicate bands to which the four frequency segments belong.

Figure 5:
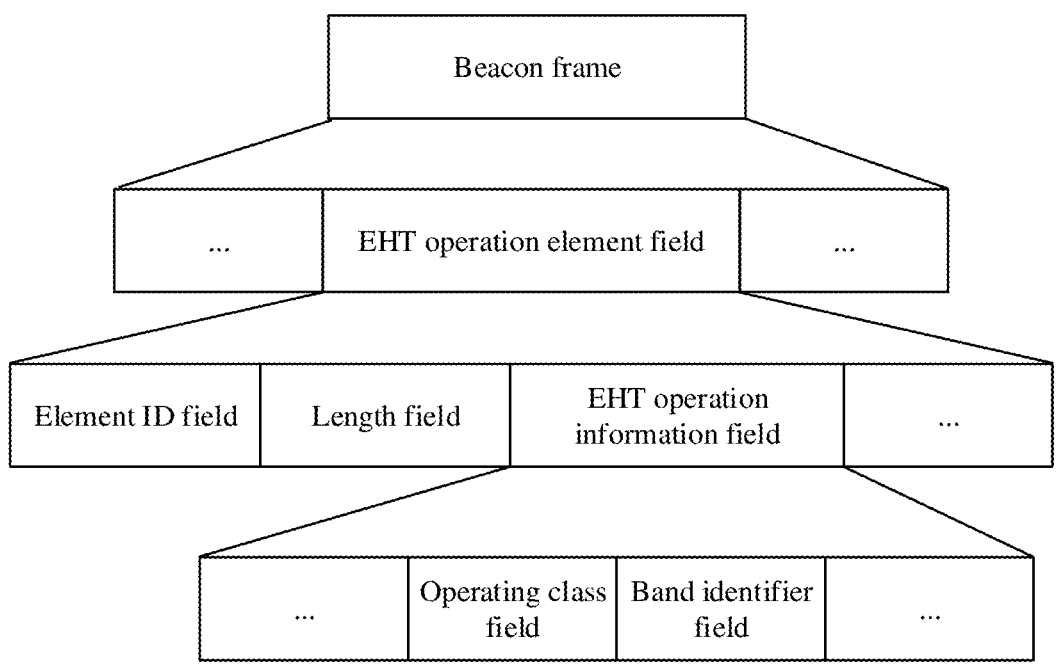
FIG. 5 is a schematic structural composition diagram of a beacon frame according to an embodiment of this application.

In some embodiments of this application, an example in which the first frame is a beacon frame is used. FIG. 5 is a schematic structural composition diagram of a beacon frame according to an embodiment of this application. The beacon frame may include an EHT operation element field, and the EHT operation element field may include an element (element) identifier (ID) field, a length (length) field, and an EHT operation information field, and the EHT operation information field may include an operating class field and a band identifier field. It is not limited that a first beacon frame may include a VHE operation element field, the VHE operation element field may include an element identifier field, a length field, and a VHE operation information field, and the VHE operation information field may include an operating class field and a band identifier field.

For example, the AP indicates an operating class field of the second band in the EHT operation element field. If the AP supports multi-band aggregation transmission, the bandwidth indication information may be carried in the sent beacon frame, and the bandwidth indication information includes bandwidth indication information for a plurality of bands. The plurality of bands may be specifically two bands or three bands. The following uses two bands as an example, and the bandwidth indication information may be an operating class field or a band ID field. A specific carrying method may be as follows: The beacon frame carries an EHT operation element field, the EHT operation element field carries an EHT operation information field, and the EHT operation information field carries an operating class field. Further, the EHT operation information field may further carry a band ID field. The operating class field is used to indicate the starting frequency of the second band. In addition, the operating class field may be further used to indicate a behavior specification of the second band.

The following describes the operating class field by using an example. A value of each operating class field specifies a group of parameters, including a starting frequency of a band, a bandwidth interval of a channel, an available channel set, and a behavior mode. For example, for the newly added 6 GHz band, one or more values of the operating class field are to be defined to specify specific values of the foregoing parameters. After the foregoing operating class field is defined, the newly defined value may be carried in the operating class field in some embodiments, and the operating class field may be used to indicate to perform multi-band aggregation transmission in the first band and the second band.

In some embodiments of this application, in addition to the operating class field of the second band, the beacon frame may further include an operating class field of the first band (that is, a band in which the primary channel is located) in the EHT operation element field.

It should be noted that the beacon frame may include the operating class field of the first band, or may not include the operating class field. For example, UE may receive the beacon frame, and obtain the starting frequency of the first band through calculation based on an actual frequency of the primary channel and a channel index number of the primary channel of the beacon frame. For example, assuming that Channel center frequency indicates an actual frequency of a channel, Channel starting frequency indicates a starting frequency of a band, and dot11CurrentChannelCenterFrequencyIndex indicates a channel index, the three parameters satisfy the following relationship:

Channel center frequency [MHz]=Channel starting frequency+5× dot11CurrentChannelCenterFrequencyIndex.

It can be learned that the starting frequency of the first band may also be calculated based on the actual frequency of the primary channel and the channel index number of the primary channel.

Figure 6:
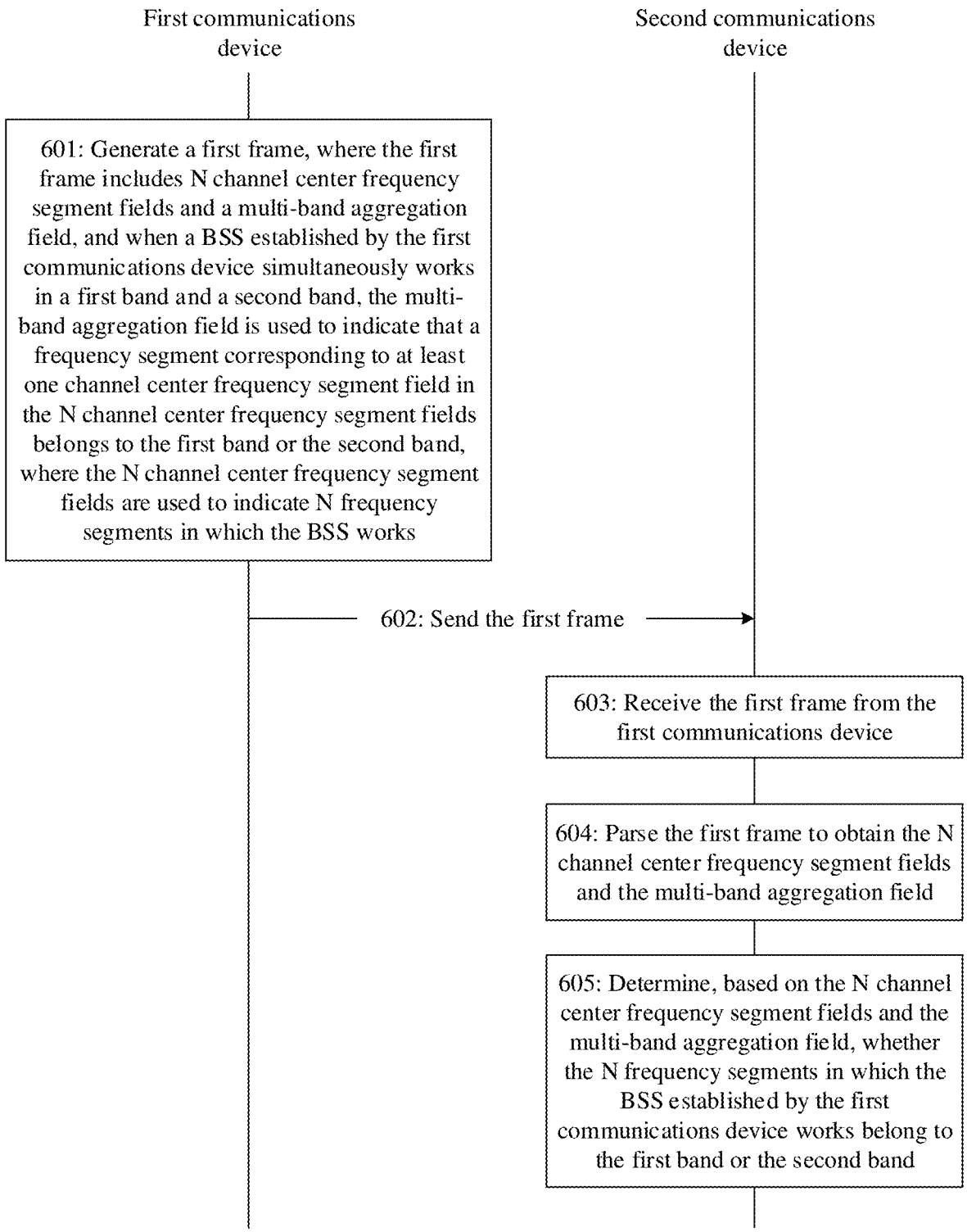
FIG. 6 is another schematic flowchart of interaction between a terminal device and a network device according to an embodiment of this application.

In some embodiments, when the first communications device and the second communications device support a plurality of bands, a detailed implementation solution is provided for how to give an indication when N frequency segments are aggregated together. FIG. 6 is another schematic flowchart of interaction between two communications devices according to an embodiment of this application. The multi-band indication method provided in the embodiments of this application mainly includes the following steps.

601: A first communications device generates a first frame, where the first frame includes N channel center frequency segment fields and a multi-band aggregation mode field, and when a BSS established by the first communications device simultaneously works in a first band and a second band, the multi-band aggregation mode field is used to indicate that a frequency segment corresponding to at least one channel center frequency segment field in the N channel center frequency segment fields belongs to the first band or the second band, where the N channel center frequency segment fields are used to indicate N frequency segments in which the BSS works, the first band is a band that includes a primary channel, the second band is a band that does not include the primary channel, and a value of N is a positive integer greater than or equal to 2.

In some embodiments, the N channel center frequency segment fields are used to indicate the N frequency segments in which the BSS works. For example, the value of N may be 4, 3, or 2. In this case, each channel center frequency segment field is used to indicate one frequency segment in which the BSS works. The first frame further includes the multi-band aggregation mode (multi-band aggregation mode) field. The multi-band aggregation mode field is used to indicate that the frequency segment corresponding to at least one channel center frequency segment field in the N channel center frequency segment fields belongs to the first band or the second band. For example, the multi-band aggregation mode field may include a plurality of values, and each value indicates a band to which one of the N channel center frequency segment fields belongs. For another example, the multi-band aggregation mode field may alternatively be a bitmap, and each bit is used to indicate whether a corresponding frequency segment belongs to the first band or the second band. For example, if the bit is 0, it indicates that the corresponding frequency segment belongs to the first band, or if the bit is 1, it indicates that the corresponding frequency segment belongs to the second band.

In some embodiments of this application, when N is equal to 4, the N channel center frequency segment fields are a first channel center frequency segment field, a second channel center frequency segment field, a third channel center frequency segment field, and a fourth channel center frequency segment field.

The multi-band aggregation mode field is used to indicate bands to which frequency segments respectively corresponding to the second channel center frequency segment field, the third channel center frequency segment field, and the fourth channel center frequency segment field belong.

The first channel center frequency segment field, the second channel center frequency segment field, the third channel center frequency segment field, and the fourth channel center frequency segment field are used to indicate four frequency segments in which the BSS works.

For example, the value of the quantity N of frequency segments in the first frame is 4. The N channel center frequency segment fields are the first channel center frequency segment field, the second channel center frequency segment field, the third channel center frequency segment field, and the fourth channel center frequency segment field. The frequency segment corresponding to the first channel center frequency segment field belongs to the first band in which the primary channel is located. The multi-band aggregation mode field may indicate the bands to which the frequency segments corresponding to the second channel center frequency segment field, the third channel center frequency segment field, and the fourth channel center frequency segment field belong. The second channel center frequency segment field, the third channel center frequency segment field, and the fourth channel center frequency segment field may belong to the first band or the second band. This specifically depends on an application scenario.

For example, in an EHT standard, there is an EHT operation element field. The EHT operation information field is a field in the EHT operation element field. The EHT operation information field may be used to describe a channel-related parameter in the EHT standard. For example, the multi-band aggregation mode field is used to indicate the bands to which the frequency segments corresponding to the second channel center frequency segment field, the third channel center frequency segment field, and the fourth channel center frequency segment field belong.

In some embodiments of this application, the first frame further includes a channel bandwidth field, and the channel bandwidth field is used to indicate a BSS bandwidth.

A length of the channel bandwidth field is one byte.

When a value of the channel bandwidth field is 4, the channel bandwidth field is used to indicate that the BSS bandwidth is 320 MHZ, 160+160 MHZ, 80+80+160 MHZ, 160+80+80 MHz, 80+160+80 MHZ, 80+80+80+80 MHZ, 240+80 MHZ, 80+240 MHZ, 240 MHZ, 160+80 MHz, 80+160 MHZ, or 80+80+80 MHZ.

Different values of the channel bandwidth field may be used to indicate BSS bandwidths. It is not limited that a same value of the channel bandwidth field may indicate a plurality of BSS bandwidths. A position of a working channel of the BSS may be determined by using the first channel center frequency segment field, the second channel center frequency segment field, the third channel center frequency segment field, and the fourth channel center frequency segment field. The first communications device may determine, based on the BSS established by the first communications device, the BSS bandwidth and the position of the working channel is used.

For example, the channel bandwidth field in the first frame may be specifically an EHT channel width field, and a length of the EHT channel width field is one byte. The channel bandwidth field is used to indicate the BSS bandwidth. For example, there may be a plurality of types of BSS bandwidths. When the BSS bandwidth is extended to 320 MHZ, a specific mode of the BSS bandwidth may be further classified into several different forms: 320 MHZ, 160+160 MHZ, 160+80+80 MHZ, 80+80+160 MHz, or 80+80+80+80 MHZ. "(+)" indicates that a total bandwidth consists of two or more different frequency segments.

Figure 7:
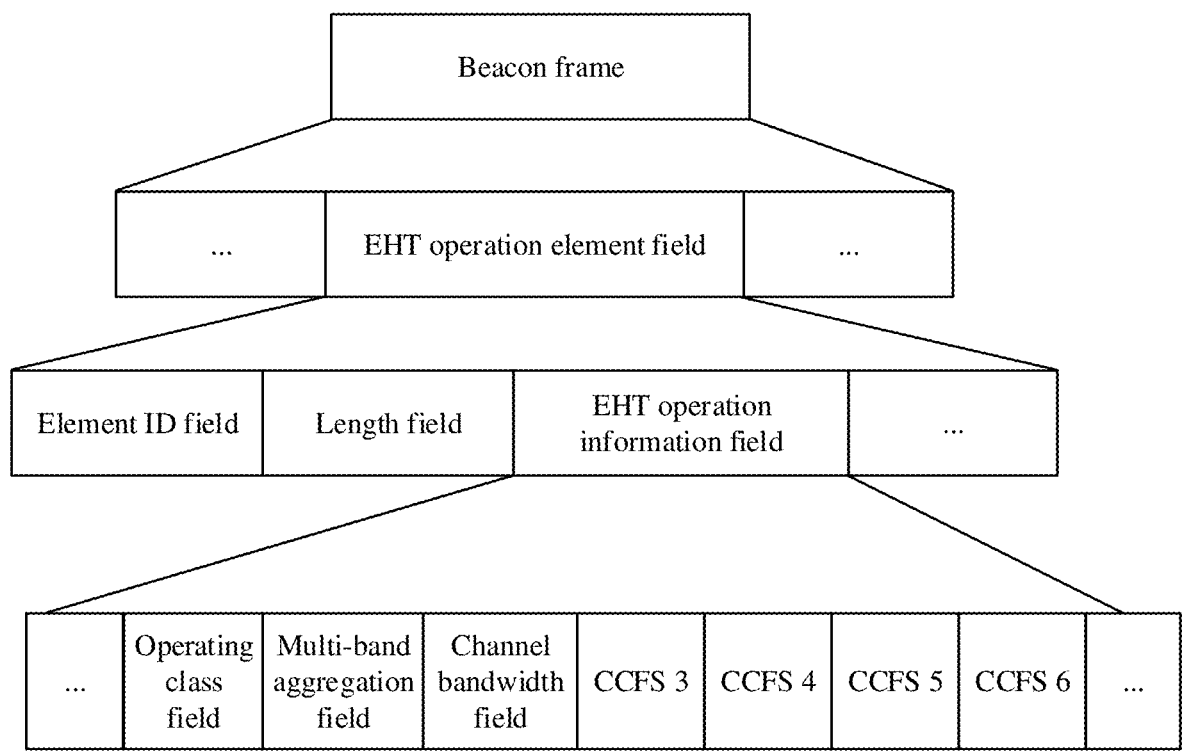
FIG. 7 is another schematic structural composition diagram of a beacon frame according to an embodiment of this application.

In some embodiments of this application, an example in which the first frame is a beacon frame is used. FIG. 7 is another schematic structural composition diagram of a beacon frame according to an embodiment of this application. The channel center frequency segment field in the first frame may be specifically a channel center frequency segment (CCFS for short) field. Specifically; the first channel center frequency segment field may be a CCFS 3, the second channel center frequency segment field may be a CCFS 4, the third channel center frequency segment field may be a CCFS 5, and the fourth channel center frequency segment field may be a CCFS 6. The position of the working channel of the BSS may be indicated by using the CCFS 3, the CCFS 4, the CCFS 5, and the CCFS 6. For example, a channel index number of a center frequency of each working channel may be indicated, and then an actual center frequency of each working channel may be calculated with reference to a starting frequency of a band. The beacon frame may include an EHT operation element field. The EHT operation element field may include an element identifier field, a length field, and an EHT operation information field. The EHT operation information field may include an operating class field, a multi-band aggregation mode field, a channel bandwidth field, a CCFS 3, a CCFS 4, a CCFS 5, and a CCFS 6.

For example, in this embodiment, it is assumed that a maximum of four frequency segments may be aggregated to form a 320 MHz channel bandwidth. To indicate center frequencies of the four frequency segments, the CCFS 3, the CCFS 4, the CCFS 5, and the CCFS 6 are carried in the EHT operation element field to indicate the center frequencies of the four frequency segments. In addition, the multi-band aggregation mode field is further carried to indicate bands to which the four frequency segments belong.

Optionally, as shown in Table 1, the multi-band aggregation mode field may be set to a special value (for example, 255) to indicate that all frequency segments belong to the first band.

| Value of the multi-band aggregation mode field | Meaning |
| --- | --- |
| 0 | The CCFS 3 belongs to the first band, and the others belong to the second band. |
| 1 | The CCFS 3 and the CCFS 4 belong to the first band, and the others belong to the second band. |
| 2 | The CCFS 3, the CCFS 4, and the CCFS 5 belong to the first band, and the other belongs to the second band. |
| . . . | . . . |
| (255) | (The four frequency segments all belong to the first band. ) |

In addition, the multi-band aggregation mode field may alternatively be a bitmap (bitmap). The bitmap includes four bits, and each bit is used to indicate whether a corresponding frequency segment belongs to the first band or the second band. For example, if the bit is 0, it indicates that the corresponding frequency segment belongs to the first band, or if the bit is 1, it indicates that the corresponding frequency segment belongs to the second band.

In addition, the channel bandwidth field is carried to indicate the BSS working bandwidth, as shown in Table 2.

| Channel bandwidth field | Definition |
| --- | --- |
| 0 | 20, 40 |
| 1 | 80, 160, 80 + 80 |
| 2 | Deprecated (deprecated) |
| 3 | Deprecated |
| 4 | 320, 160 + 160, 80 + 80 + 160, 160 + 80 + 80, 80 + 160 + 80, 80 + 80 + 80 + 80, 240 + 80, 80 + 240, 240, 160 + 80, 80 + 160, 80 + 80 + 80 |

In some embodiments of this application, a value of the first channel center frequency segment field, a value of the second channel center frequency segment field, a value of the third channel center frequency segment field, and a value of the fourth channel center frequency segment field are obtained by using a value of a current channel center frequency indicator 0, a value of a current channel center frequency indicator 1, a value of a current channel center frequency indicator 2, and a value of a current channel center frequency indicator 3.

The first communications device first determines the value of the channel bandwidth field, the first communications device determines the quantity of frequency segments, and the first communications device determines values of four indicators based on the quantity of frequency segments and a center frequency indicator used by each frequency segment. The values of the four indicators include the value of the current channel center frequency indicator 0, the value of the current channel center frequency indicator 1, the value of the current channel center frequency indicator 2, and the value of the current channel center frequency indicator 3. For example, the current channel center frequency indicator 0 may be specifically dot11CurrentChannelCenterFrequencyIndex0, the current channel center frequency indicator 1 may be specifically dot11CurrentChannelCenterFrequencyIndex1, the current channel center frequency indicator 2 may be specifically dot11CurrentChannelCenterFrequencyIndex2, and the current channel center frequency indicator 3 may be specifically dot11CurrentChannelCenterFrequencyIndex3.

In some embodiments of this application, when a position of a working channel of the BSS is the following frequency position: 320 MHZ, the value of the first channel center frequency segment field is the value of the current channel center frequency indicator 0 minus 24, the value of the second channel center frequency segment field is the value of the current channel center frequency indicator 0 minus 8, the value of the third channel center frequency segment field is the value of the current channel center frequency indicator 0 plus 8, and the value of the fourth channel center frequency segment field is the value of the current channel center frequency indicator 0 plus 24; or when a position of a working channel of the BSS is the following frequency position: 160+160 MHz, the value of the first channel center frequency segment field is the value of the current channel center frequency indicator 0 minus 8, the value of the second channel center frequency segment field is the value of the current channel center frequency indicator 0 plus 8, the value of the third channel center frequency segment field is the value of the current channel center frequency indicator 1 minus 8, and the value of the fourth channel center frequency segment field is the value of the current channel center frequency indicator 1 plus 8; or when a position of a working channel of the BSS is the following frequency position: 80+80+160 MHZ, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2 minus 8, and the value of the fourth channel center frequency segment field is the value of the current channel center frequency indicator 2 plus 8; or when a position of a working channel of the BSS is the following frequency position: 160+80+80 MHZ, the value of the first channel center frequency segment field is the value of the current channel center frequency indicator 0 minus 8, the value of the second channel center frequency segment field is the value of the current channel center frequency indicator 0 plus 8, the value of the third channel center frequency segment field is the value of the current channel center frequency indicator 1, and the value of the fourth channel center frequency segment field is the value of the current channel center frequency indicator 2; or when a position of a working channel of the BSS is the following frequency position: 80+160+80 MHz, the value of the first channel center frequency segment field is the value of the current channel center frequency indicator 0, the value of the second channel center frequency segment field is the value of the current channel center frequency indicator 1 minus 8, the value of the third channel center frequency segment field is the value of the current channel center frequency indicator 1 plus 8, and the value of the fourth channel center frequency segment field is the value of the current channel center frequency indicator 2; or when a position of a working channel of the BSS is the following frequency position: 80+80+80+80 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, and the value of the fourth channel center frequency segment field is the value of the current channel center frequency indicator 3; or when a position of a working channel of the BSS is the following frequency position: 240+80 MHZ, the value of the first channel center frequency segment field is the value of the current channel center frequency indicator 0 minus 16, the value of the second channel center frequency segment field is the value of the current channel center frequency indicator 0, the value of the third channel center frequency segment field is the value of the current channel center frequency indicator 0 plus 16, and the value of the fourth channel center frequency segment field is the value of the current channel center frequency indicator 1; or when a position of a working channel of the BSS is the following frequency position: 80+240 MHZ, the value of the first channel center frequency segment field is the value of the current channel center frequency indicator 0, the value of the second channel center frequency segment field is the value of the current channel center frequency indicator 1 minus 16, the value of the third channel center frequency segment field is the value of the current channel center frequency indicator 1, and the value of the fourth channel center frequency segment field is the value of the current channel center frequency indicator 1 plus 16; or when a position of a working channel of the BSS is the following frequency position: 240 MHz, the value of the first channel center frequency segment field is the value of the current channel center frequency indicator 0 minus 16, the value of the second channel center frequency segment field is the value of the current channel center frequency indicator 0, the value of the third channel center frequency segment field is the value of the current channel center frequency indicator 0 plus 16, and the value of the fourth channel center frequency segment field is 0; or when a position of a working channel of the BSS is the following frequency position: 160+80 MHZ, the value of the first channel center frequency segment field is the value of the current channel center frequency indicator 0 minus 8, the value of the second channel center frequency segment field is the value of the current channel center frequency indicator 0 plus 8, the value of the third channel center frequency segment field is the value of the current channel center frequency indicator 1, and the value of the fourth channel center frequency segment field is 0; or when a position of a working channel of the BSS is the following frequency position: 80+160 MHZ, the value of the first channel center frequency segment field is the value of the current channel center frequency indicator 0, the value of the second channel center frequency segment field is the value of the current channel center frequency indicator 1 minus 8, the value of the third channel center frequency segment field is the value of the current channel center frequency indicator 1 plus 8, and the value of the fourth channel center frequency segment field is 0; or when a position of a working channel of the BSS is the following frequency position: 80+80+80 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, and the value of the fourth channel center frequency segment field is 0.

It should be noted that, after the first communications device determines the position of the working channel of the BSS, the first communications device may separately determine the value of the current channel center frequency indicator 0, the value of the current channel center frequency indicator 1, the value of the current channel center frequency indicator 2, and the value of the current channel center frequency indicator 3 based on the quantity of frequency segments of the working bandwidth of the BSS and the center frequency of each frequency segment. The center frequency of the frequency segment and the current channel center frequency indicator may be determined by using a preset mapping relationship.

For example, the value "4" of the channel bandwidth field may be used to indicate all bandwidths greater than 160 MHz. For example, there are 11 channel bandwidth modes in total. In addition, the 11 channel bandwidth modes may be distinguished between each other by using different values of the channel bandwidth field. A specific channel bandwidth mode to be used may be determined by using a relationship between values of the CCFS 3, the CCFS 4, the CCFS 5, and the CCFS 6, as shown in Table 3.

indicate a channel index number of a center frequency of each 80 MHz frequency segment.

An 802.11ax station and an 802.11ac station support a maximum bandwidth of 160 MHz. When the stations are associated with an EHT BSS, even if the EHT BSS currently supports a bandwidth greater than 160 MHZ, for example, a bandwidth of 320 MHZ, the stations can use a bandwidth less than or equal to 160 MHZ. An EHT AP may indicate the BSS bandwidth to the 802.11ac station and the 802.11ax station by using values of a CCFS 0 and a CCFS 1 in the very high throughput (Very High Throughput, VHT) operation element. Specifically, the CCFS 0 may be set to a channel index number of a center frequency of an 80 MHz frequency segment in which the primary channel is located. There are two cases for setting the CCFS 1: When the 80 MHZ frequency segment in which the primary channel is located is in one contiguous 160 MHZ frequency segment, the CCFS 1 is set to a channel index number of a center frequency of the contiguous 160 MHz frequency segment. When the 80 MHz frequency segment in which the primary channel is located is not in one contiguous 160 MHz frequency segment, the CCFS 1 is set to a channel index number of a center frequency of a second 80 MHz frequency segment.

In some embodiments of this application, the first frame further includes a segment size (segment size) field, and the segment size field is used to indicate a segment size of each of the N channel center frequency segment fields.

For example, an EHT operation information field may further carry a segment size field, and the segment size field is used to indicate sizes of four frequency segments. In this case, each frequency segment may not be 80 MHZ, but may be indicated by the segment size field. The segment size may be 20 MHZ, 40 MHz, 80 MHZ, or 160 MHZ. For another example, the segment size may be 20 MHZ, 40 MHZ, or 80 MHz. For another example, the segment size may be 40

| BSS band bandwidth | CCFS 3 | CCFS 4 | CCFS 5 | CCFS 6 |
|---|---|---|---|---|
| 20, 40 | dot11CCCFI0 | 0 | | |
| 80 | dot11CCCFI0 | 0 | | |
| 160 | dot11CCCFI0 +/− 8 | dot11CCCFI0 | | |
| 80 + 80 | dot11CCCFI0 | dot11CCCFI1 | | |
| 320 | dot11CCCFI0 − 24 | dot11CCCFI0 − 8 | dot11CCCFI0 + 8 | dot11CCCFI0 + 24 |
| 160 + 160 | dot11CCCFI0 − 8 | dot11CCCFI0 + 8 | dot11CCCFI1 − 8 | dot11CCCFI1 + 8 |
| 80 + 80 + 160 | dot11CCCFI0 | dot11CCCFI1 | dot11CCCFI2 − 8 | dot11CCCFI2 + 8 |
| 160 + 80 + 80 | dot11CCCFI0 − 8 | dot11CCCFI0 + 8 | dot11CCCFI1 | dot11CCCFI2 |
| 80 + 160 + 80 | dot11CCCFI0 | dot11CCCFI1 − 8 | dot11CCCFI1 + 8 | dot11CCCFI2 |
| 80 + 80 + 80 + 80 | dot11CCCFI0 | dot11CCCFI1 | dot11CCCFI2 | dot11CCCFI3 |
| 240 + 80 | dot11CCCFI0 − 16 | dot11CCCFI0 | dot11CCCFI0 + 16 | dot11CCCFI1 |
| 80 + 240 | dot11CCCFI0 | dot11CCCFI1 − 16 | dot11CCCFI1 | dot11CCCFI1 + 16 |
| 240 | dot11CCCFI0 − 16 | dot11CCCFI0 | dot11CCCFI0 + 16 | 0 |
| 160 + 80 | dot11CCCFI0 − 8 | dot11CCCFI0 + 8 | dot11CCCFI1 | 0 |
| 80 + 160 | dot11CCCFI0 | dot11CCCFI1 − 8 | dot11CCCFI1 + 8 | 0 |
| 80 + 80 + 80 | dot11CCCFI0 | dot11CCCFI1 | dot11CCCFI2 | 0 |

Herein, dot11CCCFI is an abbreviation of dot11CurrentChannelCenterFrequencyIndex, and a value of dot11CCCFI is configured in the system. Meanings of dot11CCCFI0, dot11CCCFI1, dot11CCCFI2, and dot11CCCFI 3 are as follows: When the entire BSS bandwidth consists of several discontiguous frequency segments, dot11CCCFI0, dot11CCCFI1, dot11CCCFI2, and dot11CCCFI3 respectively represent channel index numbers of center frequencies of a first frequency segment, a second frequency segment, a third frequency segment, and a fourth frequency segment. It should be noted that the CCFS 3/4/5/6

MHZ or 80 MHZ. For another example, the segment size may be 20 MHZ or 80 MHZ. For another example, the segment size may be 80 MHz or 160 MHZ. The sizes of the four frequency segments may be the same or may be different. In different cases, the segment size field is used to indicate a size of each frequency segment. For example, there are four frequency segments in total. One variable may be used to indicate sizes of the four frequency segments. In this case, the sizes of the four frequency segments are the same. Alternatively, four variables: a segment size 1, a segment size 2, a segment size 3, and a segment size 4 may be used to indicate sizes of the four frequency segments. In this case, the sizes of the four frequency segments may be different.

Figure 8:
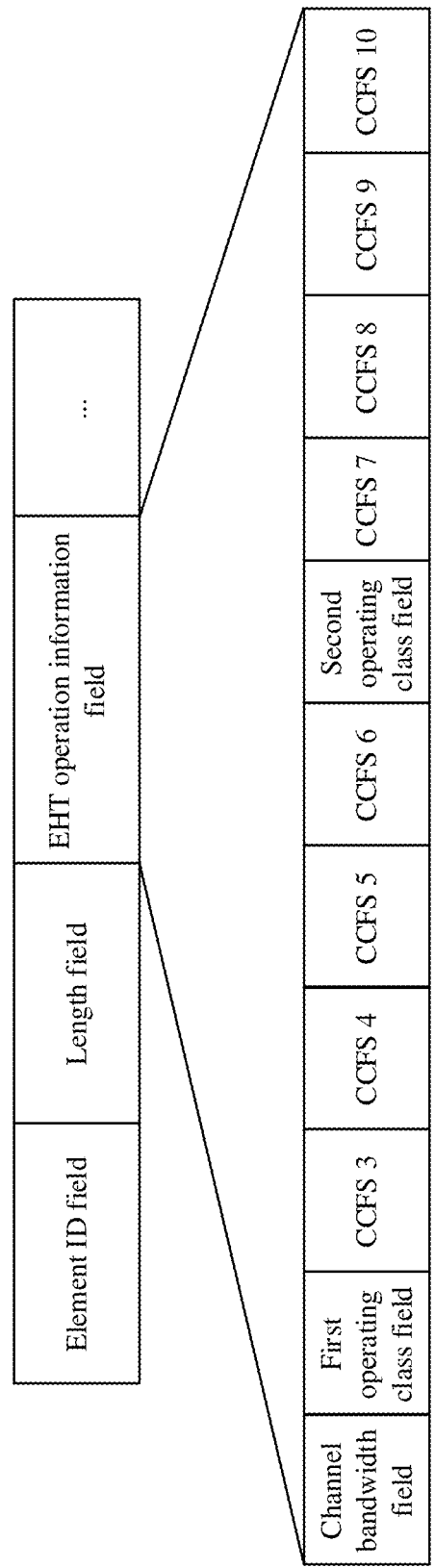
FIG. 8 is a schematic structural composition diagram of an EHT operation information field according to an embodiment of this application.

In some embodiments of this application, an example in which the first frame is a beacon frame is used. FIG. 8 is a schematic structural composition diagram of an EHT operation information field according to an embodiment of this application. The EHT operation information field includes a channel bandwidth field, a first operating class field, a CCFS 3, a CCFS 4, a CCFS 5, a CCFS 6, a second operating class field, a CCFS 7, a CCFS 8, a CCFS 9, and a CCFS 10. The first operating class field is used to indicate the CCFS 3, the CCFS 4, the CCFS 5, and the CCFS 6 of the first band, and the second operating class field is used to indicate the CCFS 7, the CCFS 8, the CCFS 9, and the CCFS 10 of the second band. In this implementation scenario, the first frame does not include the multi-band aggregation mode field.

In some embodiments of this application, when N is equal to 4, the N channel center frequency segment fields are a first channel center frequency segment field, a second channel center frequency segment field, a fifth channel center frequency segment field, and a sixth channel center frequency segment field.

The first channel center frequency segment field and the second channel center frequency segment field are in a first operation element field.

The fifth channel center frequency segment field and the sixth channel center frequency segment field are in a second operation element field.

The first operation element field and the second operation element field are in the first frame.

The first frame may include two operation element fields: the first operation element field and the second operation element field. The first operation element field may be specifically an EHT operation information field. The first channel center frequency segment field and the second channel center frequency segment field are in the first operation element field. For example, the first channel center frequency segment field may be a CCFS 3, and the second channel center frequency segment field may be a CCFS 4. The fifth channel center frequency segment field and the sixth channel center frequency segment field are in the second operation element field. The second operation element field may be specifically a VHT operation information field. The fifth channel center frequency segment field may be a CCFS 0, and the sixth channel center frequency segment field may be a CCFS 1. By using the two different operation element fields, four channel center frequency segment fields may be carried in the first frame, to implement BSS bandwidth indication when a maximum bandwidth is 320 MHz or 240 MHZ.

Figure 9:
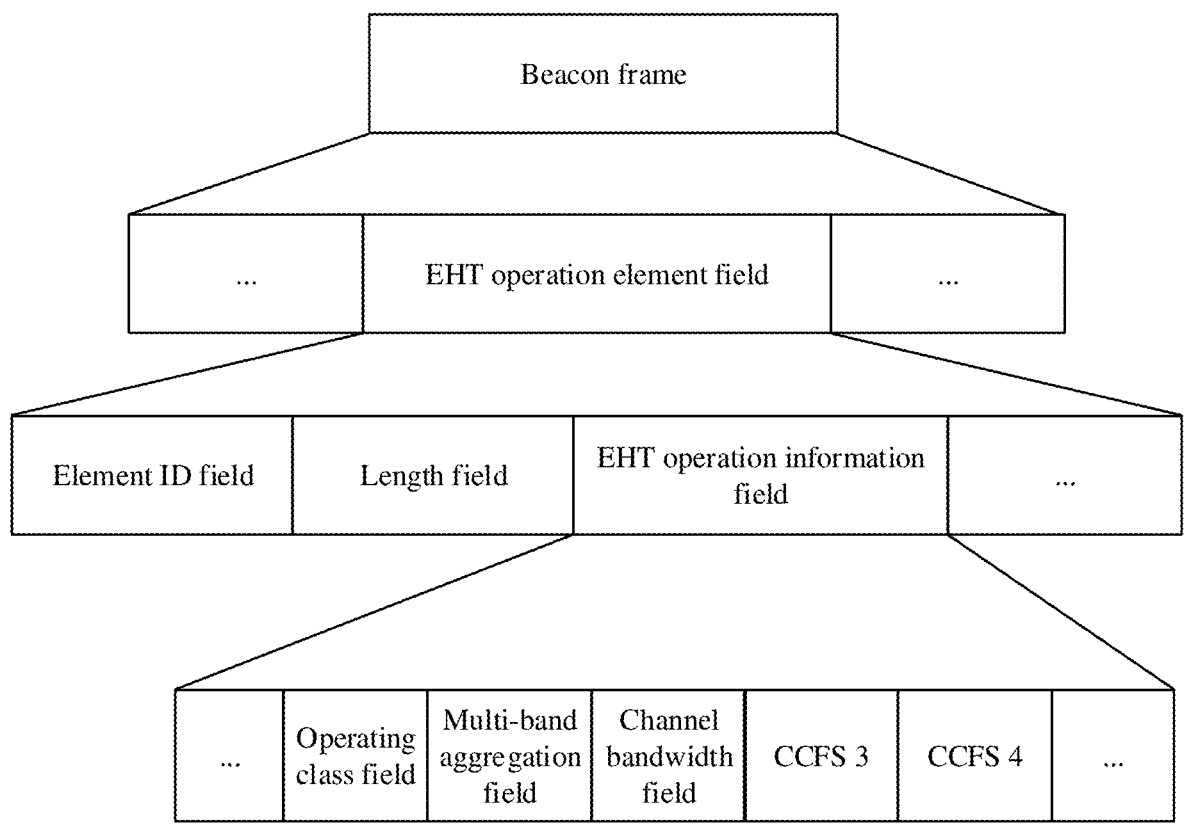
FIG. 9 is another schematic structural composition diagram of a beacon frame according to an embodiment of this application.

In some embodiments of this application, an example in which the first frame is a beacon frame is used. FIG. 9 is another schematic structural composition diagram of a beacon frame according to an embodiment of this application. The EHT operation information field includes a multi-band aggregation mode field, a channel bandwidth field, an operating class field, a CCFS 3, and a CCFS 4. For example, joint indication is performed with reference to the CCFS 0 and the CCFS 1 in the VHT operation element field. In this case, the CCFS 3 and the CCFS 4 are carried in the EHT operation element field. The CCFS 0, the CCFS 1, the CCFS 3, and the CCFS 4 may be used to indicate center frequencies of four 80 MHz frequency segments.

In some embodiments of this application, the first channel center frequency segment field and the second channel center frequency segment field are used to indicate two frequency segments, in the second band, in which the BSS works.

The fifth channel center frequency segment field and the sixth channel center frequency segment field are used to indicate two frequency segments, in the first band, in which the BSS works.

The first channel center frequency segment field may be a CCFS 3, the second channel center frequency segment field may be a CCFS 4, the fifth channel center frequency segment field may be a CCFS 0, and the sixth channel center frequency segment field may be a CCFS 1. To maintain backward compatibility; in some embodiments, meanings of the CCFS 0 and the CCFS 1 may not be modified, and values of the CCFS 3 and the CCFS 4 are designed to support a 320 MHz bandwidth and multi-band aggregation. In one manner, by default, the CCFS 0 and the CCFS 1 indicate the first band, and the CCFS 3 and the CCFS 4 indicate the second band.

In some embodiments of this application, the first channel center frequency segment field, the second channel center frequency segment field, and the fifth channel center frequency segment field are used to indicate three frequency segments, in the second band, in which the BSS works.

The sixth channel center frequency segment field is used to indicate one frequency segment, in the first band, in which the BSS works.

The first channel center frequency segment field may be a CCFS 3, the second channel center frequency segment field may be a CCFS 4, the fifth channel center frequency segment field may be a CCFS 5, and the sixth channel center frequency segment field may be a CCFS 0. To maintain backward compatibility, in some embodiments, a meaning of the CCFS 0 may not be modified, and values of the CCFS 3, the CCFS 4, and the CCFS 5 are designed to support a 320 MHz bandwidth and multi-band aggregation. In one manner, by default, the CCFS 0 indicates the first band, and the CCFS 3, the CCFS 4, and the CCFS 5 indicate the second band.

For example, the VHT operation element carries the CCFS 0 and the CCFS 1, and indicates the first band by default. The EHT operation element carries the CCFS 3, the CCFS 4, and the CCFS 5, and indicates the second band by default. The CCFS 0, the CCFS 1, the CCFS 3, the CCFS 4, and the CCFS 5 may be used to support a case in which a bandwidth working mode of the BSS is 80+240 MHz when the EHT is combined with the VHT. In other words, when the first band is 80 MHZ, the value of the CCFS 1 is 0, and the second band is 240 MHZ, the CCFS 3, the CCFS 4, and the CCFS 5 may be used to indicate three frequency segments.

In some embodiments of this application, the first frame further includes the multi-band aggregation mode field.

The fifth channel center frequency segment field and the sixth channel center frequency segment field are used to indicate two frequency segments, in the first band, in which the BSS works.

The multi-band aggregation mode field is used to indicate bands to which frequency segments corresponding to the first channel center frequency segment field and the second channel center frequency segment field belong.

The first channel center frequency segment field may be a CCFS 3, the second channel center frequency segment field may be a CCFS 4, the fifth channel center frequency segment field may be a CCFS 0, and the sixth channel center frequency segment field may be a CCFS 1. To maintain backward compatibility, in some embodiments, meanings of the CCFS 0 and the CCFS 1 may not be modified, and values of the CCFS 3 and the CCFS 4 are designed to support a 320 MHz bandwidth and multi-band aggregation. In another manner, the CCFS 0 and the CCFS 1 indicate the first band by default, and the multi-band aggregation mode field is used to indicate a band to which the CCFS 3 and the CCFS 4 belong, as shown in Table 4.

| Value of the multi-band aggregation mode field | Meaning |
| --- | --- |
| 0 | The CCFS 3 belongs to the first band, and the CCFS 4 belongs to the second band. |
| 1 | Both the CCFS 3 and the CCFS 4 belong to the second band. |
| 2 (or 255) | Both the CCFS 3 and the CCFS 4 belong to the first band. |

Further, in some embodiments of this application, the fifth channel center frequency segment field is used to indicate a center frequency of an 80 MHz frequency segment in which the primary channel is located.

The sixth channel center frequency segment field is used to: when the 80 MHZ frequency segment in which the primary channel is located is in one contiguous 160 MHZ frequency segment, indicate a center frequency of the contiguous 160 MHz frequency segment in which the primary channel is located; or when the 80 MHz frequency segment in which the primary channel is located is not in one contiguous 160 MHz frequency segment, indicate a center frequency of a second 80 MHz frequency segment in addition to the 80 MHz frequency segment in which the primary channel is located.

The first channel center frequency segment field is used to: when there is a third 80 MHz frequency segment in addition to the 80 MHz frequency segment in which the primary channel is located and the second 80 MHz frequency segment, indicate a center frequency of the third 80 MHz frequency segment.

The second channel center frequency segment field is used to: when the third 80 MHZ frequency segment is in one contiguous 160 MHz frequency segment, indicate a center frequency of the contiguous 160 MHz frequency segment in which the third 80 MHz frequency segment falls; or when the third 80 MHz frequency segment is not in one contiguous 160 MHz frequency segment, and there is a fourth 80 MHz frequency segment in addition to the 80 MHz frequency segment in which the primary channel is located, the second 80 MHz frequency segment, and the third 80 MHz frequency segment, indicate a center frequency of the fourth 80 MHz frequency segment; or when there is a fourth 80 MHz frequency segment in addition to the 80 MHz frequency segment in which the primary channel is located, the second 80 MHz frequency segment, and the third 80 MHz frequency segment, indicate a center frequency of the fourth 80 MHz frequency segment.

Specific values of the fifth channel center frequency segment field, the sixth channel center frequency segment field, the first channel center frequency segment field, and the second channel center frequency segment field may be used to indicate a frequency segment in which the BSS works. The first channel center frequency segment field may be a CCFS 3, the second channel center frequency segment field may be a CCFS 4, the fifth channel center frequency segment field may be a CCFS 0, and the sixth channel center frequency segment field may be a CCFS 1. For example, a method for setting the CCFS 0, the CCFS 1, the CCFS 3, and the CCFS 4 are shown in Table 5:

| | |
| --- | --- |
| CCFS 0 | Center frequency of a first 80 MHz frequency segment (in which the primary channel is located) |
| CCFS 1 | When an 80 MHz frequency segment in which the primary channel is located is in one contiguous 160 MHz frequency segment, the CCFS 1 is set to a channel index number of a center frequency of the contiguous 160 MHz frequency segment, or when an 80 MHz frequency segment in which the primary channel is located is not in one contiguous 160 MHz frequency segment, the CCFS 1 is set to a channel index number of a center frequency of a second 80 MHz frequency segment. |
| CCFS 3 | Center frequency of a third 80 MHz frequency segment (if any); otherwise, 0 |
| CCFS 4 | Method 1: When a third 80 MHz frequency segment is in one contiguous 160 MHz frequency segment, the CCFS 4 is set to a channel index number of a center frequency of the contiguous 160 MHz frequency segment, or when a third 80 MHz frequency segment is not in one contiguous 160 MHz frequency segment, the CCFS 4 is set to a channel index number of a center frequency of a fourth 80 MHz frequency segment (if any); otherwise, the CCFS 4 is set to 0. Method 2: The CCFS 4 is set to a channel index number of a center frequency of a fourth 80 MHz frequency segment (if any); otherwise, the CCFS 4 is set to 0. |

In the foregoing embodiment, the channel center frequency segment field and the multi-band aggregation mode field that are included in the first frame when N is equal to 4 are described. The following describes a scenario in which N is equal to 2 or 3, that is, two or three frequency segments are aggregated together in total. It should be noted that, in a subsequent embodiment, N is equal to 2 or 3. This is similar to the case in which N is equal to 4 in the foregoing embodiment. In an implementation scenario in which N is equal to 2 or 3 in the subsequent embodiment, an effect that can be achieved by the solution provided in some embodiments, is similar to that in the foregoing embodiment, and effects in all subsequent scenarios are not described in detail. For details, refer to the foregoing descriptions of the effects in the implementation scenario in which N is equal to 4.

In some embodiments of this application, when N is equal to 2, the first frame further includes a first channel center frequency segment field, a second channel center frequency segment field, and the multi-band aggregation mode field.

The multi-band aggregation mode field is used to indicate a band to which a frequency segment corresponding to the second channel center frequency segment field belongs.

The first channel center frequency segment field and the second channel center frequency segment field are used to indicate two frequency segments in which the BSS works.

Figure 10:
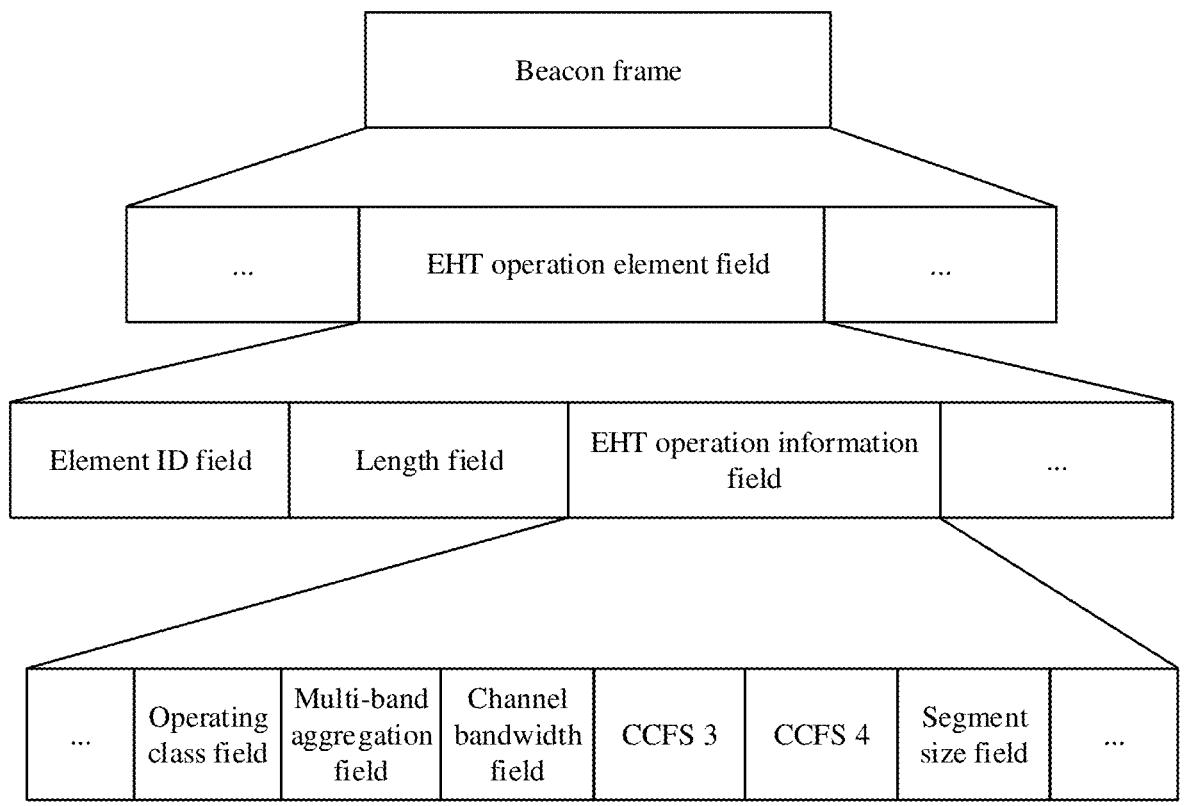
FIG. 10 is another schematic structural composition diagram of a beacon frame according to an embodiment of this application.

In some embodiments of this application, an example in which the first frame is a beacon frame is used. FIG. 10 is another schematic structural composition diagram of a beacon frame according to an embodiment of this application. The EHT operation information field includes a channel bandwidth field, an operating class field, a multi-band aggregation mode field, a CCFS 3, a CCFS 4, and a segment size field. The multi-band aggregation mode field is used to indicate a segment size of the CCFS 4.

In some embodiments of this application, the first frame further includes a channel bandwidth field, and the channel bandwidth field is used to indicate a BSS bandwidth.

A length of the channel bandwidth field is one byte.

When a value of the channel bandwidth field is 4, the channel bandwidth field is used to indicate that the BSS bandwidth is 320 MHz or 160+160 MHZ.

In some embodiments of this application, a value of the first channel center frequency segment field and a value of the second channel center frequency segment field are obtained by using a value of a current channel center frequency indicator 0 and a value of a current channel center frequency indicator 1.

In some embodiments of this application, when a position of a working channel of the BSS is the following frequency position: 320 MHZ, the value of the first channel center frequency segment field is the value of the current channel center frequency indicator 0 minus 16, and the value of the second channel center frequency segment field is the value of the current channel center frequency indicator 0 plus 16; or
  when a position of a working channel of the BSS is the following frequency position: 160+160 MHZ, the value of the first channel center frequency segment field is the value of the current channel center frequency indicator 0, and the value of the second channel center frequency segment field is the value of the current channel center frequency indicator 1.

In some embodiments of this application, when a position of a working channel of the BSS is the following frequency position: 320 MHz, the value of the first channel center frequency segment field is the value of the current channel center frequency indicator 0 minus 16 or plus 16, and the value of the second channel center frequency segment field is the value of the current channel center frequency indicator 0; or
  when a position of a working channel of the BSS is the following frequency position: 160+160 MHz, the value of the first channel center frequency segment field is the value of the current channel center frequency indicator 0, and the value of the second channel center frequency segment field is the value of the current channel center frequency indicator 1.

In some embodiments of this application, the first frame further includes a channel bandwidth field, and the channel bandwidth field is used to indicate a BSS bandwidth.

A length of the channel bandwidth field is one byte.

When a value of the channel bandwidth field is 4, the channel bandwidth field is used to indicate that the BSS bandwidth is 320 MHz; or
  when a value of the channel bandwidth field is 5, the channel bandwidth field is used to indicate that the BSS bandwidth is 160+160 MHz; or
  when a value of the channel bandwidth field is 6, the channel bandwidth field is used to indicate that the BSS bandwidth is 240+80 MHz; or
  when a value of the channel bandwidth field is 7, the channel bandwidth field is used to indicate that the BSS bandwidth is 80+240 MHz; or
  when a value of the channel bandwidth field is 8, the channel bandwidth field is used to indicate that the BSS bandwidth is 240 MHz; or
  when a value of the channel bandwidth field is 9, the channel bandwidth field is used to indicate that the BSS bandwidth is 160+80 MHz; or
  when a value of the channel bandwidth field is 10, the channel bandwidth field is used to indicate that the BSS bandwidth is 80+160 MHz.

In some embodiments of this application, when a position of a working channel of the BSS is the following frequency position: 320 MHZ, the value of the first channel center frequency segment field is the value of the current channel center frequency indicator 0 minus 16, and the value of the second channel center frequency segment field is the value of the current channel center frequency indicator 0 plus 16; or
  when a position of a working channel of the BSS is the following frequency position: 160+160 MHz, the value of the first channel center frequency segment field is the value of the current channel center frequency indicator 0, and the value of the second channel center frequency segment field is the value of the current channel center frequency indicator 1; or
  when a position of a working channel of the BSS is the following frequency position: 240+80 MHz, the value of the first channel center frequency segment field is the value of the current channel center frequency indicator 0, and the value of the second channel center frequency segment field is the value of the current channel center frequency indicator 1; or
  when a position of a working channel of the BSS is the following frequency position: 80+240 MHz, the value of the first channel center frequency segment field is the value of the current channel center frequency indicator 0, and the value of the second channel center frequency segment field is the value of the current channel center frequency indicator 1; or
  when a position of a working channel of the BSS is the following frequency position: 240 MHz, the value of the first channel center frequency segment field is the value of the current channel center frequency indicator 0 minus 12, and the value of the second channel center frequency segment field is the value of the current channel center frequency indicator 0 plus 12; or
  when a position of a working channel of the BSS is the following frequency position: 160+80 MHz, the value of the first channel center frequency segment field is the value of the current channel center frequency indicator 0, and the value of the second channel center frequency segment field is the value of the current channel center frequency indicator 1; or
  when a position of a working channel of the BSS is the following frequency position: 80+160 MHz, the value of the first channel center frequency segment field is the value of the current channel center frequency indicator 0, and the value of the second channel center frequency segment field is the value of the current channel center frequency indicator 1.

In some embodiments of this application, the first channel center frequency segment field and the second channel center frequency segment field are two contiguous frequency segments.
  when a position of a working channel of the BSS is the following frequency position: 320 MHZ, the value of the first channel center frequency segment field is the value of the current channel center frequency indicator 0 plus 16 or minus 16, and the value of the second channel center frequency segment field is the value of the current channel center frequency indicator 0; or
  when a position of a working channel of the BSS is the following frequency position: 160+160 MHz, the value of the first channel center frequency segment field is the value of the current channel center frequency indicator 0, and the value of the second channel center frequency segment field is the value of the current channel center frequency indicator 1; or
  when a position of a working channel of the BSS is the following frequency position: 240+80 MHZ, the value of the first channel center frequency segment field is the value of the current channel center frequency indicator 0, and the value of the second channel center frequency segment field is the value of the current channel center frequency indicator 1; or when a position of a working channel of the BSS is the following frequency position: 80+240 MHZ, the value of the first channel center frequency segment field is the value of the current channel center frequency indicator 0, and the value of the second channel center frequency segment field is the value of the current channel center frequency indicator 1; or when a position of a working channel of the BSS is the following frequency position: 240 MHz, the value of the first channel center frequency segment field is the value of the current channel center frequency indicator 0 minus 12 or plus 12, and the value of the second channel center frequency segment field is the value of the current channel center frequency indicator 0; or when a position of a working channel of the BSS is the following frequency position: 160+80 MHZ, the value of the first channel center frequency segment field is the value of the current channel center frequency indicator 0, and the value of the second channel center frequency segment field is the value of the current channel center frequency indicator 1; or when a position of a working channel of the BSS is the following frequency position: 80+160 MHZ, the value of the first channel center frequency segment field is the value of the current channel center frequency indicator 0, and the value of the second channel center frequency segment field is the value of the current channel center frequency indicator 1.

In some embodiments of this application, the first frame further includes a first channel center frequency segment field, a second channel center frequency segment field, a third operating class field, a third channel center frequency segment field, and a fourth channel center frequency segment field.

The first operating class field is used to indicate that the first channel center frequency segment field and the second channel center frequency segment field belong to the second band.

The first channel center frequency segment field and the second channel center frequency segment field are used to indicate two frequency segments, in the second band, in which the BSS works.

The third operating class field is used to indicate that the third channel center frequency segment field and the fourth channel center frequency segment field belong to the first band.

The third channel center frequency segment field and the fourth channel center frequency segment field are used to indicate two frequency segments, in the first band, in which the BSS works.

The following uses an example to describe a multi-band aggregation scenario when N is equal to 2.

In this embodiment, it is assumed that a maximum of two frequency segments may be aggregated to form a 320 MHz channel bandwidth. To indicate center frequencies of the two frequency segments, the CCFS 3 and the CCFS 4 are carried in the EHT operation element to indicate the center frequencies of the two frequency segments. FIG. 10 is another schematic structural diagram of a first frame according to an embodiment of this application.

Because a maximum of two frequency segments are aggregated, to support a maximum channel bandwidth of 320 MHz, the following two cases are discussed.

In a first case, a bandwidth value of each frequency segment is 160 MHz. In this case, a channel bandwidth greater than 160 MHz may be contiguous 320 MHz and 160+160 MHz. Therefore, a value is assigned to a channel bandwidth (channel bandwidth, CW) field to indicate the bandwidths of 320 MHz and 160+160 MHz, as shown in Table 6.

| CW | Definition |
| --- | --- |
| 0 | 20, 40 |
| 1 | 80, 160, 80 + 80 |
| 2 | Deprecated |
| 3 | Deprecated |
| 4 | 320, 160 + 160 |

The CCFS 3 and the CCFS 4 may be set in the following methods:

In a first method, the CCFS 3 and the CCFS 4 indicate center frequencies of two 160 5 MHz bandwidths, as shown in Table 7.

| BSS bandwidth | CCFS 3 | CCFS 4 |
| --- | --- | --- |
| 320 | dot11CCCFI0 − 16 | dot11CCCFI0 + 16 |
| 160 + 160 | dot11CCCFI0 | dot11CCCFI1 |

In a second method, when the bandwidth is 160+160 MHz, the CCFS 3 and the CCFS 4 indicate center frequencies of two 160 MHz bandwidths, or when the bandwidth is 320 MHZ, the CCFS 3 indicates a center frequency of a first 160 MHz bandwidth, and the CCFS 4 indicates a center frequency of the entire 320 MHz bandwidth, as shown in Table 8.

| BSS bandwidth | CCFS 3 | CCFS 4 |
| --- | --- | --- |
| 320 | dot11CCCFI0 +/− 16 | dot11CCCFI0 |
| 160 + 160 | dot11CCCFI0 | dot11CCCFI1 |

In a second case, a bandwidth value of each frequency segment is variable. To support a frequency segment of a variable bandwidth, the segment size field may be carried in the EHT operation information field to indicate sizes of the two frequency segments, for example, 160 MHz or 80 MHz. Specifically, there may be two values, a first value indicates a bandwidth value of the CCFS 3, and a second value indicates a bandwidth value of the CCFS 4. Alternatively, there may be a table, and each entry in the table indicates a combination of different bandwidth values of the CCFS 3 and the CCFS 4. Alternatively, there may be one value that is used to indicate bandwidth values of the CCFS 3 and the CCFS 4, and bandwidth values of the two CCFSs are equal.

If the segment size field is not carried, different values of the "channel width" field may be used to distinguish between bandwidths of two frequency segments, as shown in Table 9.

| CW | Definition |
| --- | --- |
| 0 | 20, 40 |
| 1 | 80, 160, 80 + 80 |
| 2 | Deprecated |
| 3 | Deprecated |
| 4 | 320 |

-continued

| CW | Definition |
|---|---|
| 5 | 160 + 160 |
| 6 | 240 + 80 |
| 7 | 80 + 240 |
| 8 | 240 |
| 9 | 160 + 80 |
| 10 | 80 + 160 |

The CCFS 3 and the CCFS 4 may alternatively be set in the following methods:

In a first method, the CCFS 3 and the CCFS 4 indicate center frequencies of two frequency segments, as shown in Table 10.

| BSS bandwidth | CCFS 3 | CCFS 4 |
|---|---|---|
| 20, 40 | dot11CCCFI0 | 0 |
| 80 | dot11CCCFI0 | 0 |
| 160 | dot11CCCFI0 − 8 | dot11CCCFI0 + 8 |
| 80 + 80 | dot11CCCFI0 | dot11CCCFI1 |
| 320 | dot11CCCFI0 − 16 | dot11CCCFI0 + 16 |
| 160 + 160 | dot11CCCFI0 | dot11CCCFI1 |
| 240 + 80 | dot11CCCFI0 | dot11CCCFI1 |
| 80 + 240 | dot11CCCFI0 | dot11CCCFI1 |
| 240 | dot11CCCFI0 − 12 | dot11CCCFI0 + 12 |
| 160 + 80 | dot11CCCFI0 | dot11CCCFI1 |
| 80 + 160 | dot11CCCFI0 | dot11CCCFI1 |

In a second method, when there are two discontiguous frequency segments, the CCFS 3 and the CCFS 4 indicate center frequencies of the two frequency segments, or when there is one frequency segment, the CCFS 3 indicates a center frequency of a first 80 MHz frequency segment, and the CCFS 4 indicates a center frequency of the entire frequency segment, as shown in Table 11.

| BSS bandwidth | CCFS 3 | CCFS 4 |
|---|---|---|
| 20, 40 | dot11CCCFI0 | 0 |
| 80 | dot11CCCFI0 | 0 |
| 160 | dot11CCCFI0 +/− 8 | dot11CCCFI0 |
| 80 + 80 | dot11CCCFI0 | dot11CCCFI0 |
| 320 | dot11CCCFI0 +/− 16 | dot11CCCFI0 |
| 160 + 160 | dot11CCCFI0 | dot11CCCFI1 |
| 240 + 80 | dot11CCCFI0 | dot11CCCFI1 |
| 80 + 240 | dot11CCCFI0 | dot11CCCFI1 |
| 240 | dot11CCCFI0 +/− 12 | dot11CCCFI0 |
| 160 + 80 | dot11CCCFI0 | dot11CCCFI1 |
| 80 + 160 | dot11CCCFI0 | dot11CCCFI1 |

Similarly, the multi-band aggregation mode field may be used to indicate a band to which the CCFS 3 and the CCFS 4 belong, for example, by using an indication method in Table 12.

| Value of the multi-band aggregation mode field | Meaning |
|---|---|
| 0 | The CCFS 3 belongs to the first band, and the CCFS 4 belongs to the second band. |
| 1 | Both the CCFS 3 and the CCFS 4 belong to the first band. |

Alternatively, a value of an operating class field is used to determine whether the CCFS 3 and the CCFS 4 belong to a same band or different bands. For example, when the value of the operating class field is not a special value, the CCFS 3 and the CCFS 4 belong to two bands, or when the value of the operating class field is a special value (for example, 255), both the CCFS 3 and the CCFS 4 belong to the first band.

Figure 11:
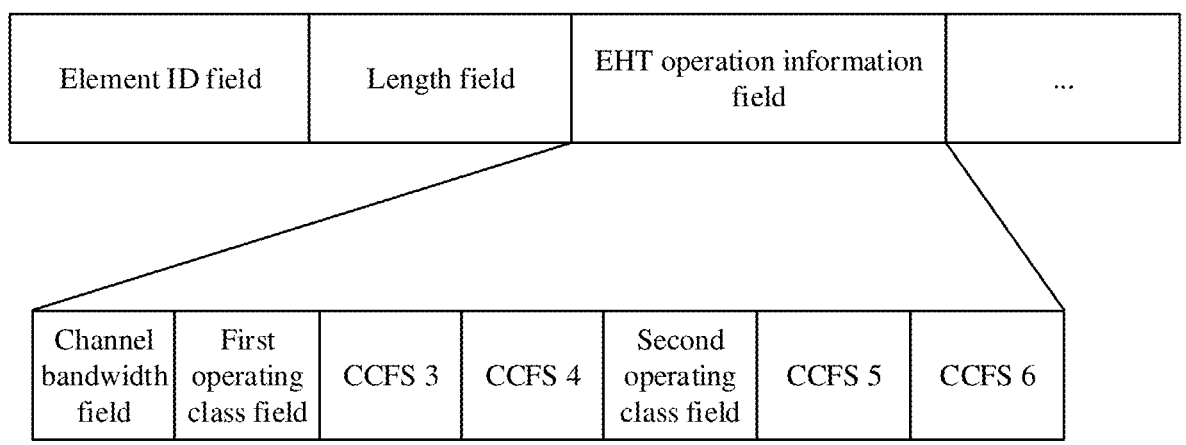
FIG. 11 is another schematic structural composition diagram of an EHT operation information field according to an embodiment of this application.

FIG. 11 is another schematic structural composition diagram of an EHT operation information field according to an embodiment of this application. The EHT operation information field includes a channel bandwidth field, a first operating class field, a CCFS 3, a CCFS 4, a second operating class field, a CCFS 5, and a CCFS 6. CCFSs belonging to the two bands are separately indicated without using the multi-band aggregation mode field.

In the foregoing embodiment, the channel center frequency segment field and the multi-band aggregation mode field that are included in the first frame when N is equal to 2 are described. The following describes a scenario in which N is equal to 3, that is, three frequency segments are aggregated together in total.

In some embodiments of this application, the first frame further includes a first channel center frequency segment field, a second channel center frequency segment field, a third channel center frequency segment field, and the multi-band aggregation mode field.

The multi-band aggregation mode field is used to indicate bands to which frequency segments corresponding to the second channel center frequency segment field and the third channel center frequency segment field belong.

The first channel center frequency segment field, the second channel center frequency segment field, and the third channel center frequency segment field are used to indicate three frequency segments in which the BSS works.

In some embodiments of this application, the first frame further includes a channel bandwidth field, and the channel bandwidth field is used to indicate a BSS bandwidth.

A length of the channel bandwidth field is one byte.

When a value of the channel bandwidth field is 4, the channel bandwidth field is used to indicate that the BSS bandwidth is 320 MHZ, 160+160 MHZ, 80+80+160 MHZ, 80+240 MHZ, or 80+160 MHZ.

In some embodiments of this application, a value of the first channel center frequency segment field and a value of the second channel center frequency segment field are obtained by using a value of a current channel center frequency indicator 0, a value of a current channel center frequency indicator 1, and a value of a current channel center frequency indicator 2.

In some embodiments of this application, when a position of a working channel of the BSS is the following frequency position: 320 MHZ, the value of the first channel center frequency segment field is the value of the current channel center frequency indicator 0 minus 24, the value of the second channel center frequency segment field is the value of the current channel center frequency indicator 0 minus 8, and the value of the third channel center frequency segment field is the value of the current channel center frequency indicator 0 plus 16; or when a position of a working channel of the BSS is the following frequency position: 160+160 MHZ, the value of the first channel center frequency segment field is the value of the current channel center frequency indicator 0 minus 8, the value of the second channel center frequency segment field is the value of the current channel center frequency indicator 0 plus 8, and the value of the third channel center frequency segment field is the value of the current channel center frequency indicator 1; or when a position of a working channel of the BSS is the following frequency position: 80+80+160 MHz, the value of the first channel center frequency segment field is the value of the current channel center frequency indicator 0, the value of the second channel center frequency segment field is the value of the current channel center frequency indicator 1, and the value of the third channel center frequency segment field is the value of the current channel center frequency indicator 2; or when a position of a working channel of the BSS is the following frequency position: 80+240 MHz, the value of the first channel center frequency segment field is the value of the current channel center frequency indicator 0, the value of the second channel center frequency segment field is the value of the current channel center frequency indicator 1 minus 16, and the value of the third channel center frequency segment field is the value of the current channel center frequency indicator 1 plus 8; or when a position of a working channel of the BSS is the following frequency position: 80+160 MHz, the value of the first channel center frequency segment field is the value of the current channel center frequency indicator 0, the value of the second channel center frequency segment field is 0, and the value of the third channel center frequency segment field is the value of the current channel center frequency indicator 1.

In some embodiments of this application, the first frame further includes a segment size field, and the segment size field is used to indicate a segment size of each of the first channel center frequency segment field, the second channel center frequency segment field, and the third channel center frequency segment field.

In some embodiments of this application, a length of the channel bandwidth field is one byte.

When a value of the channel bandwidth field is 4, the channel bandwidth field is used to indicate that the BSS bandwidth is 320 MHz; or when a value of the channel bandwidth field is 5, the channel bandwidth field is used to indicate that the BSS bandwidth is 160+160 MHz; or when a value of the channel bandwidth field is 6, the channel bandwidth field is used to indicate that the BSS bandwidth is 80+80+160 MHz; or when a value of the channel bandwidth field is 7, the channel bandwidth field is used to indicate that the BSS bandwidth is 80+240 MHz; or when a value of the channel bandwidth field is 8, the channel bandwidth field is used to indicate that the BSS bandwidth is 240 MHz; or when a value of the channel bandwidth field is 9, the channel bandwidth field is used to indicate that the BSS bandwidth is 80+160 MHz; or when a value of the channel bandwidth field is 10, the channel bandwidth field is used to indicate that the BSS bandwidth is 160+80 MHz; or when a value of the channel bandwidth field is 11, the channel bandwidth field is used to indicate that the BSS bandwidth is 80+80+80 MHz.

In some embodiments of this application, when a position of a working channel of the BSS is the following frequency position: 320 MHZ, the value of the first channel center frequency segment field is the value of the current channel center frequency indicator 0 minus 24, the value of the second channel center frequency segment field is the value of the current channel center frequency indicator 0 minus 8, and the value of the third channel center frequency segment field is the value of the current channel center frequency indicator 0 plus 16; or when a position of a working channel of the BSS is the following frequency position: 160+160 MHz, the value of the first channel center frequency segment field is the value of the current channel center frequency indicator 0 minus 8, the value of the second channel center frequency segment field is the value of the current channel center frequency indicator 0 plus 8, and the value of the third channel center frequency segment field is the value of the current channel center frequency indicator 1; or when a position of a working channel of the BSS is the following frequency position: 80+80+160 MHz, the value of the first channel center frequency segment field is the value of the current channel center frequency indicator 0, the value of the second channel center frequency segment field is the value of the current channel center frequency indicator 1, and the value of the third channel center frequency segment field is the value of the current channel center frequency indicator 2; or when a position of a working channel of the BSS is the following frequency position: 80+240 MHz, the value of the first channel center frequency segment field is the value of the current channel center frequency indicator 0, the value of the second channel center frequency segment field is the value of the current channel center frequency indicator 1 minus 16, and the value of the third channel center frequency segment field is the value of the current channel center frequency indicator 1 plus 8; or when a position of a working channel of the BSS is the following frequency position: 240 MHz, the value of the first channel center frequency segment field is the value of the current channel center frequency indicator 0 minus 16, the value of the second channel center frequency segment field is the value of the current channel center frequency indicator 0, and the value of the third channel center frequency segment field is the value of the current channel center frequency indicator 0 plus 16; or when a position of a working channel of the BSS is the following frequency position: 160+80 MHZ, the value of the first channel center frequency segment field is the value of the current channel center frequency indicator 0 minus 8, the value of the second channel center frequency segment field is the value of the current channel center frequency indicator 0 plus 8, and the value of the third channel center frequency segment field is the value of the current channel center frequency indicator 1; or when a position of a working channel of the BSS is the following frequency position: 80+160 MHz, the value of the first channel center frequency segment field is the value of the current channel center frequency indicator 0, the value of the second channel center frequency segment field is the value of the current channel center frequency indicator 1 minus 8, and the value of the third channel center frequency segment field is the value of the current channel center frequency indicator 1 plus 8; or when a position of a working channel of the BSS is the following frequency position: 80+80+80 MHz, the value of the first channel center frequency segment field is the value of the current channel center frequency indicator 0, the value of the second channel center frequency segment field is the value of the current channel center frequency indicator 1, and the value of the third channel center frequency segment field is the value of the current channel center frequency indicator 2.

In some embodiments of this application, the first frame further includes a first channel center frequency segment field, a fifth channel center frequency segment field, and a sixth channel center frequency segment field.

The first channel center frequency segment field is in a first operation element field.

The fifth channel center frequency segment field and the sixth channel center frequency segment field are in a second operation element field.

The first operation element field and the second operation element field are in the first frame.

In some embodiments of this application, the first channel center frequency segment field is used to indicate one frequency segment, in the second band, in which the BSS works.

The fifth channel center frequency segment field and the sixth channel center frequency segment field are used to indicate two frequency segments, in the first band, in which the BSS works.

In some embodiments of this application, the first frame further includes the multi-band aggregation mode field.

The fifth channel center frequency segment field and the sixth channel center frequency segment field are used to indicate two frequency segments, in the first band, in which the BSS works.

The multi-band aggregation mode field is used to indicate a band to which a frequency segment corresponding to the first channel center frequency segment field belongs.

In some embodiments of this application, the fifth channel center frequency segment field is used to indicate a center frequency of an 80 MHz frequency segment in which the primary channel is located.

The sixth channel center frequency segment field is used to: when the 80 MHz frequency segment in which the primary channel is located is in one contiguous 160 MHz frequency segment, indicate a center frequency of the contiguous 160 MHz frequency segment; or when the 80 MHz frequency segment in which the primary channel is located is not in one contiguous 160 MHz frequency segment, indicate a center frequency of a second 80 MHz frequency segment in addition to the 80 MHz frequency segment in which the primary channel is located.

The first channel center frequency segment field is used to: when the BSS bandwidth is 320 MHz, 160+160 MHz, 80+80+160 MHz, or 80+240 MHz, indicate a center frequency of a last contiguous 160 MHz frequency segment in addition to the contiguous 160 MHz frequency segment; or when the BSS bandwidth is 240 MHz, 80+160 MHz, 160+80 MHZ, or 80+80+80 MHz, indicate a center frequency of a last 80 MHz frequency segment.

The following uses an example to describe a multi-band aggregation scenario when N is equal to 3.

Figure 12:
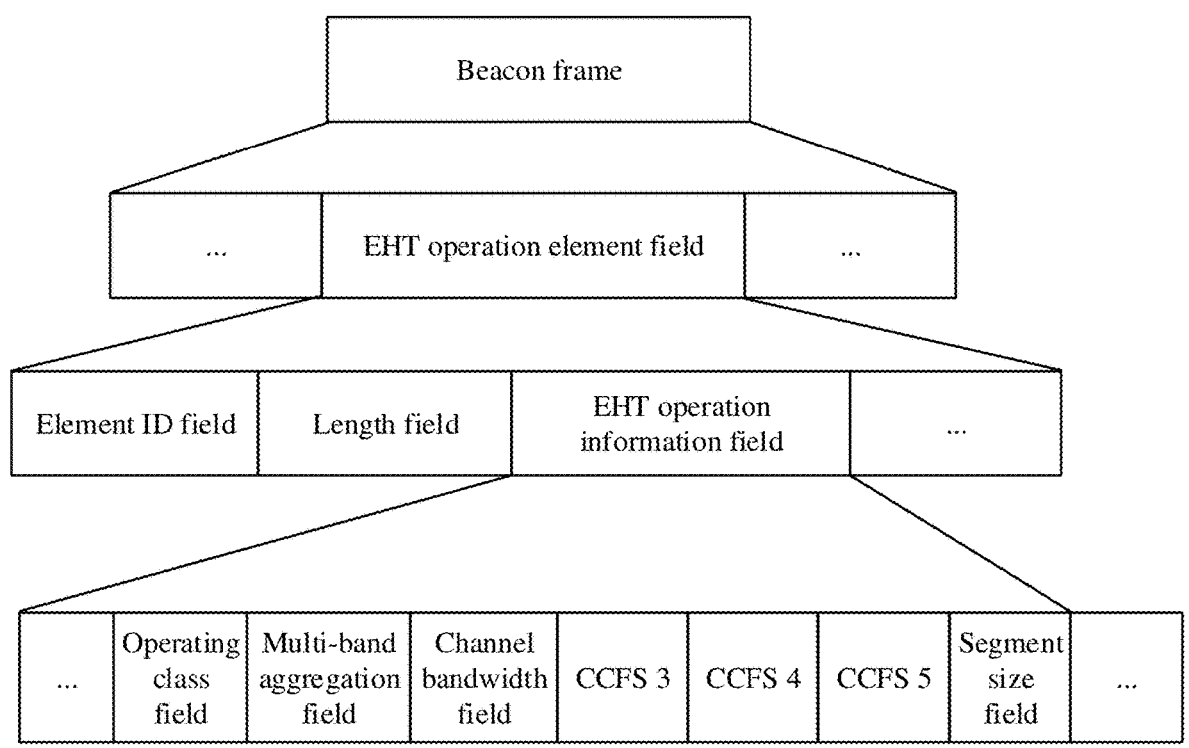
FIG. 12 is another schematic structural composition diagram of a beacon frame according to an embodiment of this application.

In this embodiment, it is assumed that a maximum of three frequency segments may be aggregated to form a 320 MHz channel bandwidth. To indicate center frequencies of the three frequency segments, the CCFS 3, the CCFS 4, and the CCFS 5 are carried in the EHT operation element to indicate the center frequencies of the three frequency segments. FIG. 12 is another schematic structural composition diagram of a beacon frame according to an embodiment of this application.

The following three cases are discussed:

In a first case, sizes of the three frequency segments are 80 MHZ, 80 MHz, and 160 MHz. In this case, a channel bandwidth greater than 160 MHz may be contiguous 320 MHz, 160+160 MHz, 80+80+160 MHz, 80+240 MHz, and 80+160 MHz. Therefore, a value is to be assigned to a channel width field to indicate the five bandwidths, as shown in Table 13.

| Channel width | Definition |
| --- | --- |
| 0 | 20, 40 |
| 1 | 80, 160, 80 + 80 |
| 2 | Deprecated |
| 3 | Deprecated |
| 4 | 320, 160 + 160, 80 + 80 + 160, 80 + 240, 80 + 160 |

Table 14 shows a method for setting the CCFS 3, the CCFS 4, and the CCFS 5.

| BSS bandwidth | CCFS 3 | CCFS 4 | CCFS 5 |
| --- | --- | --- | --- |
| 320 | dot11CCCFI0 − 24 | dot11CCCFI0 − 8 | dot11CCCFI0 + 16 |
| 160 + 160 | dot11CCCFI0 − 8 | dot11CCCFI0 + 8 | dot11CCCFI1 |
| 80 + 80 + 160 | dot11CCCFI0 | dot11CCCFI1 | dot11CCCFI2 |
| 80 + 240 | dot11CCCFI0 | dot11CCCFI1 − 16 | dot11CCCFI1 + 8 |
| 80 + 160 | dot11CCCFI0 | 0 | dot11CCCFI1 |

In a second case, a bandwidth value of a third frequency segment is variable. To support a frequency segment of a variable bandwidth, the segment size field may be carried in the EHT operation information field to indicate a size of the third frequency segment, for example, 160 MHz or 80 MHz.

If the segment size field is not carried, different values of the "channel width" field may be used to distinguish between bandwidths of two frequency segments (segment), as shown in Table 15.

| CW | Definition |
| --- | --- |
| 0 | 20, 40 |
| 1 | 80, 160, 80 + 80 |
| 2 | Deprecated |
| 3 | Deprecated |
| 4 | 320 |
| 5 | 160 + 160 |
| 6 | 80 + 80 + 160 |
| 7 | 80 + 240 |
| 8 | 240 |
| 9 | 80 + 160 |
| 10 | 160 + 80 |
| 11 | 80 + 80 + 80 |

Table 16 shows a method for setting the CCFS 3, the CCFS 4, and the CCFS 5.

| BSS bandwidth | CCFS 3 | CCFS 4 | CCFS 5 |
| --- | --- | --- | --- |
| 320 | dot11CCCFI0 − 24 | dot11CCCFI0 − 8 | dot11CCCFI0 + 16 |
| 160 + 160 | dot11CCCFI0 − 8 | dot11CCCFI0 + 8 | dot11CCCFII |
| 80 + 80 + 160 | dot11CCCFI0 | dot11CCCFI1 | dot11CCCFI2 |
| 80 + 240 | dot11CCCFI0 | dot11CCCFI1 − 16 | dot11CCCFI1 + 8 |
| 240 | dot11CCCFI0 − 16 | dot11CCCFI0 | dot11CCCFI0 + 16 |
| 160 + 80 | dot11CCCFI0 − 8 | dot11CCCFI0 + 8 | dot11CCCFI1 |
| 80 + 160 | dot11CCCFI0 | dot11CCCFI1 − 8 | dot11CCCFI1 + 8 |

-continued

| BSS bandwidth | CCFS 3 | CCFS 4 | CCFS 5 |
|---|---|---|---|
| 80 + 80 + 80 | dot11CCCFI0 | dot11CCCFI1 | dot11CCCFI2 |

Similarly, the multi-band aggregation mode field may be used to indicate a band to which the CCFS 3 and the CCFS 4 belong, for example, by using an indication method in Table 17.

| Value of the multi-band aggregation mode field | Meaning |
|---|---|
| 0 | The CCFS 3 belongs to the first band, and the CCFS 4 and the CCFS 5 belong to the second band. |
| 1 | The CCFS 3 and the CCFS 4 belong to the first band, and the CCFS 5 belongs to the second band. |
| 2 (or 255) | The CCFS 3, the CCFS 4, and the CCFS 5 all belong to the first band. |

Optionally, it may be stipulated that, when a value of an operating class field is a special value (for example, 255), the CCFS 3, the CCFS 4, and the CCFS 5 all belong to the first band.

Figure 13:
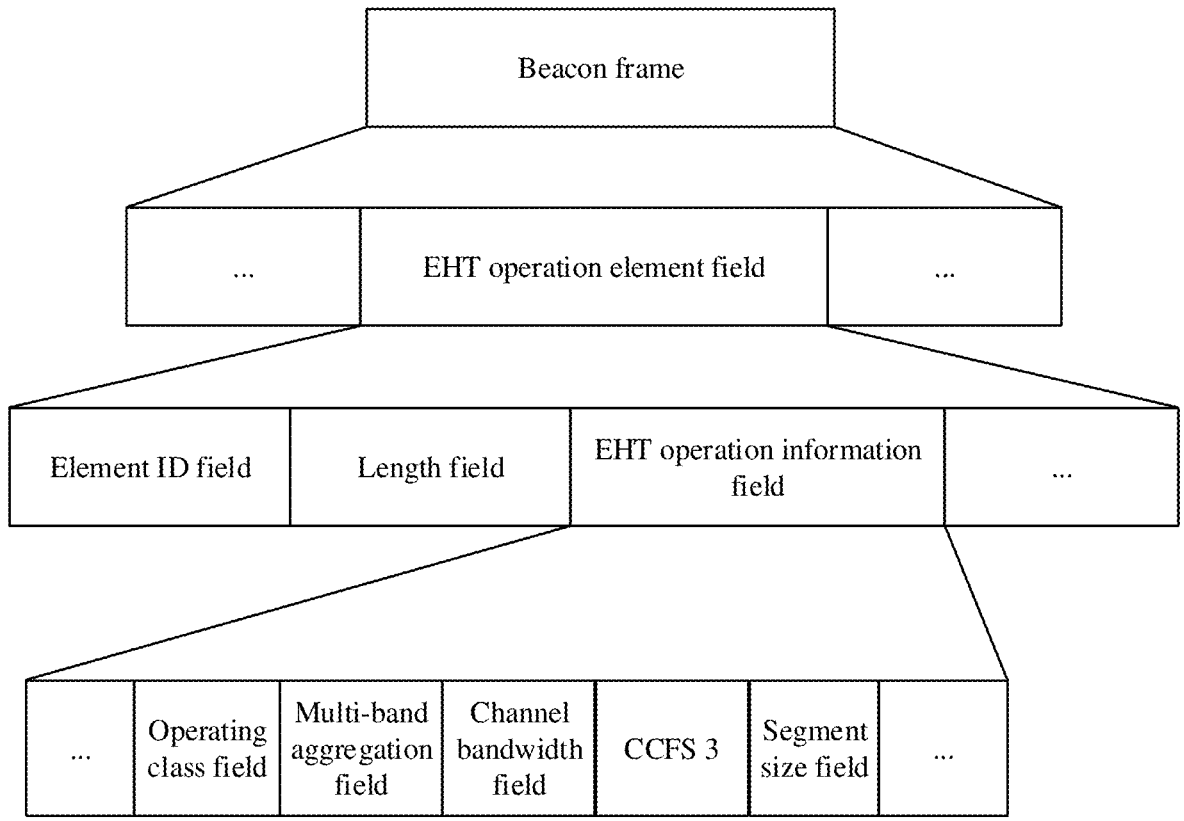
FIG. 13 is another schematic structural composition diagram of a beacon frame according to an embodiment of this application.

In another implementation, joint indication is performed with reference to the CCFS 0 and the CCFS 1 in the VHT operation element. In this case, the CCFS 3 is to be carried in the EHT operation element. FIG. 13 is another schematic structural composition diagram of a beacon frame according to an embodiment of this application.

Similar to the foregoing solution, a bandwidth value of the CCFS 3 may be 160 MHz, or may be indicated by the segment size field. Details are not described herein again.

Functions of the CCFS 3, the CCFS 4, and the CCFS 5 in the foregoing solution in this embodiment may be respectively implemented by using the CCFS 0, the CCFS 1, and the CCFS 3. In this case, the solution is similar to the foregoing solution. To maintain backward compatibility, meanings of the CCFS 0 and the CCFS 1 may not be modified, and a value of the CCFS 3 is designed to support a 320 MHz bandwidth and multi-band aggregation.

In one manner, by default, the CCFS 0/1 indicates the first band, and the CCFS 3 indicates the second band.

In another manner, the CCFS 0/1 indicates the band 1 by default, and the multi-band aggregation mode field is used to indicate a band to which the CCFS 3 belongs, for example, by using an indication method in Table 18.

| Value of the multi-band aggregation mode field | Meaning |
|---|---|
| 0 | The CCFS 3 belongs to the second band. |
| 1 | The CCFS 3 belongs to the first band. |

Table 19 shows a method for setting the CCFS 0, the CCFS 1, and the CCFS 3.

| | |
|---|---|
| CCFS 0 | Center frequency of a first 80 MHz frequency segment (in which the primary channel is located) |
| CCFS 1 | When an 80 MHz frequency segment in which the primary channel is located is in one contiguous 160 MHz frequency segment, the CCFS 1 is set to a channel index number of a center frequency of the contiguous 160 MHz frequency segment, or when an 80 MHz frequency segment in which the primary channel is located is not in one contiguous 160 MHz frequency segment, the CCFS 1 is set to a channel index number of a center frequency of a second 80 MHz frequency segment. |
| CCFS 3 | When the bandwidth is 320 MHz, 160 + 160 MHz, 80 + 80 + 160 MHz, or 80 + 240 MHz, the CCFS 3 indicates a center frequency of a last contiguous 160 MHz frequency segment. When the bandwidth is 240 MHz, 80 + 160 MHz, 160 + 80 MHz, or 80 + 80 + 80 MHz, the CCFS 3 indicates a center frequency of a last 80 MHz frequency segment. |

It can be learned from the example description of the foregoing embodiment that, in some embodiments, an operating class field of the second band may be carried in the EHT operation element field. In some embodiments, the multi-band aggregation mode field may be further added to the beacon frame to indicate bands to which four, two, or three CCFSs belong. In some embodiments, the segment size field may be further added to the beacon frame to indicate a bandwidth value of a segment. In some embodiments, the channel bandwidth field may be further added to the beacon frame to indicate various different bandwidth aggregation modes.

602: The first communications device sends the first frame.

In some embodiments, after the first communications device generates the foregoing first frame, the first communications device may send the first frame over a communications network. For example, if the first communications device and the second communications device are in a same communications network, the first communications device may send the first frame to the second communications device. For a description of a frame structure of the first frame, refer to the detailed description of the foregoing content.

In some embodiments, the first frame generated by the first communications device may specifically include a management frame. For example, the first frame may be specifically a beacon frame, or the first frame is another management frame. For example, the first frame may be specifically an association response frame. A specific implementation of the first frame may be determined with reference to an application scenario.

603: The second communications device receives the first frame from the first communications device.

In some embodiments, the first communications device and the second communications device are in a same communications network. The first communications device may send the first frame to the second communications device, and the second communications device may receive the first frame over the communications network.

604: The second communications device parses the first frame to obtain the N channel center frequency segment fields and the multi-band aggregation mode field, where the value of N is a positive integer greater than or equal to 2.

After generating the first frame, the first communications device sends the first frame to the second communications device. After receiving the first frame, the second communications device may parse the first frame in a preconfigured frame structure parsing manner to obtain the N channel center frequency segment fields and the multi-band aggregation mode field, and obtain the values of the N channel center frequency segment fields and the value of the multi-band aggregation mode field.

605: The second communications device determines, based on the N channel center frequency segment fields and the multi-band aggregation mode field, that the N frequency segments in which the BSS established by the first communications device works belong to the first band or the second band, where the first band is the band that includes the primary channel, and the second band is the band that does not include the primary channel.

In some embodiments, after determining the N channel center frequency segment fields and the multi-band aggregation mode field, the second communications device obtains the values of the N channel center frequency segment fields and the value of the multi-band aggregation mode field, and the second communications device determines, based on the N channel center frequency segment fields and the multi-band aggregation mode field, that the N frequency segments in which the BSS works belong to the first band or the second band. Therefore, the second communications device may determine the N frequency segments used by the first communications device, to perform multi-band aggregation transmission.

It can be learned from the example description of some embodiments that the first frame generated by the first communications device includes the N channel center frequency segment fields and the multi-band aggregation mode field, and the first communications device sends the first frame to the second communications device. Therefore, the second communications device may obtain the N channel center frequency segment fields and the multi-band aggregation mode field based on the received first frame, and accordingly determine that the N frequency segments in which the BSS works belong to the first band or the second band. Therefore, in some embodiments, frequency segment indication can be implemented in a multi-band aggregation scenario, and resource utilization efficiency can be improved.

It should be noted that, for brief description, the foregoing method embodiments are represented as a series of actions. However, a person skilled in the art should appreciate that this application is not limited to the described order of the actions, because according to this application, some steps may be performed in another order or simultaneously. It should be further appreciated by a person skilled in the art that the embodiments described in this specification all belong to embodiments, and the actions and modules are not necessarily required by this application.

To better implement the foregoing solutions in the embodiments of this application, the following further provides related apparatuses for implementing the foregoing solutions.

Figure 14:
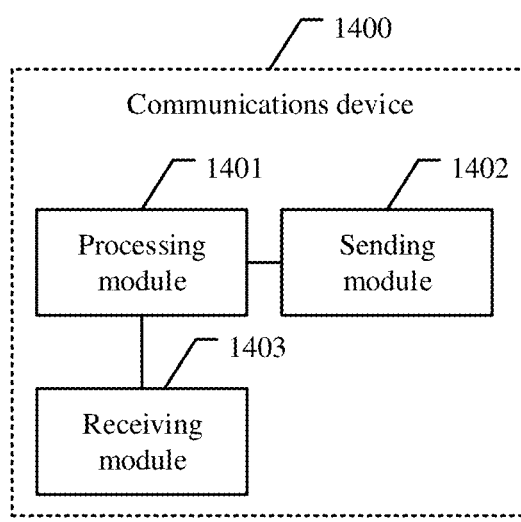
FIG. 14 is a schematic structural composition diagram of a communications device according to an embodiment of this application.

An embodiment of this application provides a communications device. As shown in FIG. 14, a communications device 1400 may be a first communications device or a second communications device. It should be understood that the first communications device described in this embodiment has any function of the first communications device in the foregoing methods, and the second communications device in this embodiment has any function of the second communications device in the foregoing methods. The communications device 1400 may include a processing module 1401, a sending module 1402, and a receiving module 1403. The processing module 1401 is separately connected to the sending module 1402 and the receiving module 1403. The following describes functions of the modules in the communications device 1400.

For example, the first communications device includes:
a processing module, configured to generate a first frame, where the first frame includes a first operating class field, and when a basic service set BSS established by the first communications device simultaneously works in a first band and a second band, the first operating class field is used to indicate a starting frequency of the second band, where the first band is a band that includes a primary channel, and the second band is a band that does not include the primary channel; and
a sending module, configured to send the first frame.

For example, the second communications device includes:
a receiving module, configured to receive a first frame from a first communications device; and
a processing module, configured to parse the first frame to obtain a first operating class field, where
the processing module is configured to determine, based on the first operating class field, a starting frequency of a second band in which a basic service set BSS established by the first communications device works, where the BSS simultaneously works in a first band and the second band, the first band is a band that includes a primary channel, and the second band is a band that does not include the primary channel.

For example, the first communications device includes:
a processing module, configured to generate a first frame, where the first frame includes N channel center frequency segment fields and a multi-band aggregation mode field, and when a basic service set BSS established by the first communications device simultaneously works in a first band and a second band, the multi-band aggregation mode field is used to indicate that a frequency segment corresponding to at least one channel center frequency segment field in the N channel center frequency segment fields belongs to the first band or the second band, where the N channel center frequency segment fields are used to indicate N frequency segments in which the BSS works, the first band is a band that includes a primary channel, the second band is a band that does not include the primary channel, and a value of N is a positive integer greater than or equal to 2; and
a sending module, configured to send the first frame.

For example, the second communications device includes:
a receiving module, configured to receive a first frame from a first communications device; and
a processing module, configured to parse the first frame to obtain N channel center frequency segment fields and a multi-band aggregation mode field, where a value of N is a positive integer greater than or equal to 2, where
the processing module is configured to determine, based on the N channel center frequency segment fields and the multi-band aggregation mode field, that N frequency segments in which a basic service set BSS established by the first communications device works belong to a first band or a second band, where the first band is a band that includes a primary channel, and the second band is a band that does not include the primary channel.

In the embodiments of this application, the communications device provided in the foregoing embodiment may be implemented in a plurality of product forms. For example, the communications device may be configured as a general-purpose processing system. For example, the communication device may be implemented by a general bus architecture. For example, the communication device may be implemented by an application specific-integrated circuit (application specific-integrated circuit, ASIC). The following provides several possible product forms of the communications device in the embodiments of this application. It should be understood that the following is merely an example, and the possible product forms of the embodiments of this application are not limited thereto.

Figure 15:
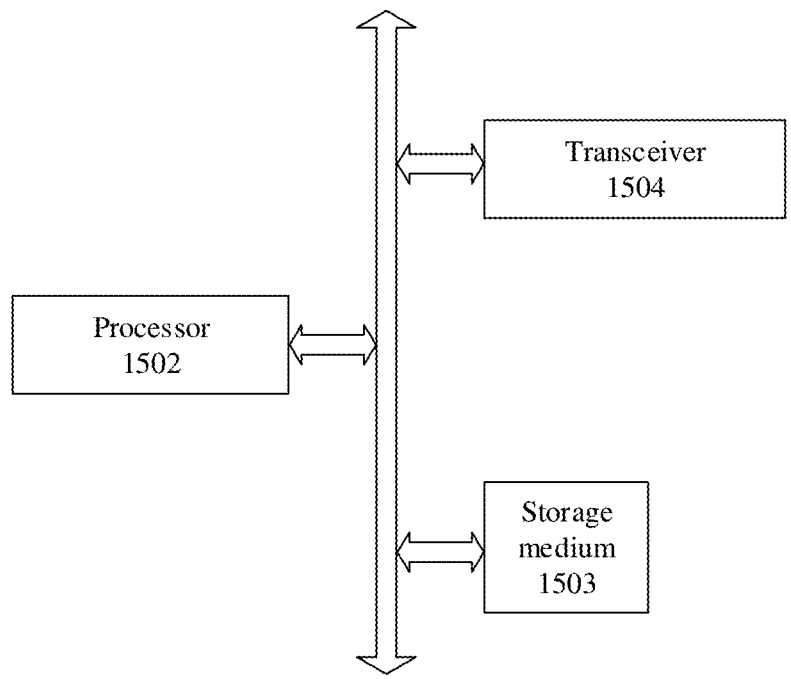
FIG. 15 is a schematic structural composition diagram of another communications device according to an embodiment of this application.

FIG. 15 is a structural diagram of a possible product form of a communications device according to an embodiment of this application. In a possible product form, the communications device may be the foregoing first communications device or the foregoing second communications device. It should be understood that the first communications device in this embodiment has any function of the first communications device in the foregoing methods. The second communications device in this embodiment has any function of the second communications device in the foregoing methods. The first communications device or the second communications device includes a processor 1502 and a transceiver 1504. Optionally, the communications device may further include a storage medium 1503. The processor 1502, the transceiver 1504, and the storage medium 1503 communicate with each other through an internal connection path.

In some embodiments of this application, the processor 1502 is configured to perform the method in any possible implementation of the first communications device. The transceiver 1504 is controlled by the processor 1502 to perform signal receiving and sending in the method in any possible implementation of the first communications device. The storage medium 1503 is configured to store instructions, and the instructions are invoked by the processor to perform the method in any possible implementation of the first communications device.

In some other embodiments of this application, the processor 1502 is configured to perform the method in any possible implementation of the second communications device. The transceiver 1504 is controlled by the processor 1502 to perform signal receiving and sending in the method in any possible implementation of the second communications device. The storage medium 1503 is configured to store instructions, and the instructions are invoked by the processor to perform the method in any possible implementation of the second communications device.

Figure 16:
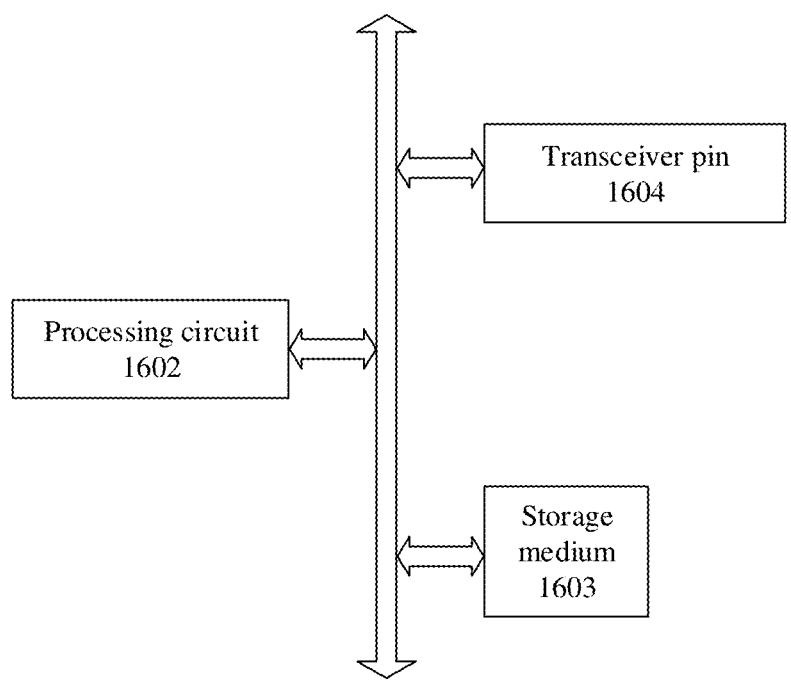
FIG. 16 is a schematic structural composition diagram of another communications device according to an embodiment of this application.

FIG. 16 is a structural diagram of a possible product form of a communications device according to an embodiment of this application. In a possible product form, the communications device is also implemented by a general-purpose processor, that is, implemented by a commonly known chip. The general-purpose processor includes a processing circuit 1602 and a transceiver pin 1604. It is not limited that the transceiver pin in the general-purpose processor may be replaced with a transceiver interface. Optionally, the general-purpose processor may further include a storage medium 1603. The processing circuit 1602, the transceiver pin 1604, and the storage medium 1603 communicate with each other through an internal connection path. It should be understood that the general-purpose processor in this embodiment has any function of the first communications device in the foregoing methods, or has any function of the second communications device in the foregoing methods.

In some embodiments of this application, the processing circuit 1602 is configured to perform the method in any possible implementation of the first communications device. The transceiver pin 1604 is controlled by the processing circuit 1602 to perform signal receiving and sending in the method in any possible implementation of the first communications device. The storage medium 1603 is configured to store instructions, and the instructions are invoked by the processing circuit to perform the method in any possible implementation of the first communications device.

In some other embodiments of this application, the processing circuit 1602 is configured to perform the method in any possible implementation of the second communications device. The transceiver pin 1604 is controlled by the processing circuit 1602 to perform signal receiving and sending in the method in any possible implementation of the second communications device. The storage medium 1603 is configured to store instructions, and the instructions are invoked by a processor to perform the method in any possible implementation of the second communications device.

In another possible product form, the communications device may also be implemented by the following: one or more field programmable gate arrays (field programmable gate array, FPGA), a programmable logic device (programmable logic device, PLD), a controller, a state machine, gate logic, a discrete hardware component, any other suitable circuit, or any combination of circuits that can perform various functions described in this application.

In addition, it should be noted that the described apparatus embodiments are merely examples. The units described as separate parts may or may not be physically separate, and parts displayed as units may or may not be physical units, may be located in one position, or may be distributed on a plurality of network units. Some or all of the modules may be selected based on an actual requirement to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables. A person of ordinary skill in the art may understand and implement the embodiments without creative efforts.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by corresponding hardware. Moreover, a specific hardware structure used to achieve a same function may be of various forms, for example, in a form of an analog circuit, a digital circuit, or a dedicated circuit. However, as for this application, software program implementation is a better implementation in most cases. Based on such an understanding, the technical solutions of this application essentially or the part contributing to some approaches may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, including one or more usable media. The usable medium may be a magnetic medium (for example, a floppy disk, a hard disk, or a magnetic tape), an optical medium (for example, a DVD), a semiconductor medium (for example, a solid-state drive, SSD), or the like.

What is claimed is:

1. A multi-band indication method, comprising:
generating, by a first communications device, a first frame, wherein the first frame comprises a first operating class field, and in response to a basic service set (BSS) configured to be established by the first communications device configured to simultaneously operate in a first band and a second band, the first operating class field indicates a starting frequency of the second band, wherein the first band is a band that comprises a primary channel, and the second band is a band that fails to include the primary channel; and
sending, by the first communications device, the first frame,
wherein the first frame further comprises N channel center frequency segment fields and a multi-band aggregation mode field, and a value of N is a positive integer greater than or equal to 2;
the multi-band aggregation mode field indicates a band to which a frequency segment corresponding to at least one channel center frequency segment field in the N channel center frequency segment fields belongs; and
the N channel center frequency segment fields indicate N frequency segments in which the BSS is configured to operate.

2. The method according to claim 1, wherein in response to N being equal to 4, the N channel center frequency segment fields are a first channel center frequency segment field, a second channel center frequency segment field, a third channel center frequency segment field, and a fourth channel center frequency segment field;
the multi-band aggregation mode field is indicates bands to which frequency segments corresponding to the second channel center frequency segment field, the third channel center frequency segment field, and the fourth channel center frequency segment field belong; and
the first channel center frequency segment field, the second channel center frequency segment field, the third channel center frequency segment field, and the fourth channel center frequency segment field indicate four frequency segments in which the BSS is configured to operate.

3. The method according to claim 2, wherein the first frame further comprises a channel bandwidth field, and the channel bandwidth field indicates a BSS bandwidth;
a length of the channel bandwidth field is one byte; and
in response to a value of the channel bandwidth field being 4, the channel bandwidth field indicates that the BSS bandwidth is 320 megahertz (MHz), 160+160 MHz, 80+80+160 MHZ, 160+80+80 MHz, 80+160+80 MHz, 80+80+80+80 MHz, 240+80 MHz, 80+240 MHz, 240 MHZ, 160+80 MHz, 80+160 MHz, or 80+80+80 MHZ.

4. The method according to claim 2, wherein a value of the first channel center frequency segment field, a value of the second channel center frequency segment field, a value of the third channel center frequency segment field, and a value of the fourth channel center frequency segment field are configured to be obtained by a value of a current channel center frequency indicator 0, a value of a current channel center frequency indicator 1, a value of a current channel center frequency indicator 2, and a value of a current channel center frequency indicator 3.

5. The method according to claim 4, wherein in response to a position of a working channel of the BSS is the following frequency position:
320 megahertz (MHz), the value of the first channel center frequency segment field is the value of the current channel center frequency indicator 0 minus 24, the value of the second channel center frequency segment field is the value of the current channel center frequency indicator 0 minus 8, the value of the third channel center frequency segment field is the value of the current channel center frequency indicator 0 plus 8, and the value of the fourth channel center frequency segment field is the value of the current channel center frequency indicator 0 plus 24; or
160+160 MHz, the value of the first channel center frequency segment field is the value of the current channel center frequency indicator 0 minus 8, the value of the second channel center frequency segment field is the value of the current channel center frequency indicator 0 plus 8, the value of the third channel center frequency segment field is the value of the current channel center frequency indicator 1 minus 8, and the value of the fourth channel center frequency segment field is the value of the current channel center frequency indicator 1 plus 8; or
80+80+160 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2 minus 8, and the value of the fourth channel center frequency segment field is the value of the current channel center frequency indicator 2 plus 8; or
160+80+80 MHz, the value of the first channel center frequency segment field is the value of the current channel center frequency indicator 0 minus 8, the value of the second channel center frequency segment field is the value of the current channel center frequency indicator 0 plus 8, the value of the third channel center frequency segment field is the value of the current channel center frequency indicator 1, and the value of the fourth channel center frequency segment field is the value of the current channel center frequency indicator 2; or 80+160+80 MHz, the value of the first channel center frequency segment field is the value of the current channel center frequency indicator 0, the value of the second channel center frequency segment field is the value of the current channel center frequency indicator 1 minus 8, the value of the third channel center frequency segment field is the value of the current channel center frequency indicator 1 plus 8, and the value of the fourth channel center frequency segment field is the value of the current channel center frequency indicator 2; or 80+80+80+80 MHZ, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, and the value of the fourth channel center frequency segment field is the value of the current channel center frequency indicator 3; or 240+80 MHz, the value of the first channel center frequency segment field is the value of the current channel center frequency indicator 0 minus 16, the value of the second channel center frequency segment field is the value of the current channel center frequency indicator 0, the value of the third channel center frequency segment field is the value of the current channel center frequency indicator 0 plus 16, and the value of the fourth channel center frequency segment field is the value of the current channel center frequency indicator 1; or 80+240 MHz, the value of the first channel center frequency segment field is the value of the current channel center frequency indicator 0, the value of the second channel center frequency segment field is the value of the current channel center frequency indicator 1 minus 16, the value of the third channel center frequency segment field is the value of the current channel center frequency indicator 1, and the value of the fourth channel center frequency segment field is the value of the current channel center frequency indicator 1 plus 16; or 240 MHz, the value of the first channel center frequency segment field is the value of the current channel center frequency indicator 0 minus 16, the value of the second channel center frequency segment field is the value of the current channel center frequency indicator 0, the value of the third channel center frequency segment field is the value of the current channel center frequency indicator 0 plus 16, and the value of the fourth channel center frequency segment field is 0; or 160+80 MHz, the value of the first channel center frequency segment field is the value of the current channel center frequency indicator 0 minus 8, the value of the second channel center frequency segment field is the value of the current channel center frequency indicator 0 plus 8, the value of the third channel center frequency segment field is the value of the current channel center frequency indicator 1, and the value of the fourth channel center frequency segment field is 0; or 80+160 MHz, the value of the first channel center frequency segment field is the value of the current channel center frequency indicator 0, the value of the second channel center frequency segment field is the value of the current channel center frequency indicator 1 minus 8, the value of the third channel center frequency segment field is the value of the current channel center frequency indicator 1 plus 8, and the value of the fourth channel center frequency segment field is 0; or 80+80+80 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, and the value of the fourth channel center frequency segment field is 0.

6. The method according to claim 1, wherein the first frame further comprises a segment size field, and the segment size field indicates a segment size of each of the N channel center frequency segment fields.

7. The method according to claim 1, wherein in response to N being equal to 4, the N channel center frequency segment fields are a first channel center frequency segment field, a second channel center frequency segment field, a fifth channel center frequency segment field, and a sixth channel center frequency segment field;
the first channel center frequency segment field and the second channel center frequency segment field are in a first operation element field;
the fifth channel center frequency segment field and the sixth channel center frequency segment field are in a second operation element field; and
the first operation element field and the second operation element field are in the first frame.

8. The method according to claim 7, wherein the first channel center frequency segment field and the second channel center frequency segment field indicate two frequency segments, in the second band, in which the BSS is configured to operate; and
the fifth channel center frequency segment field and the sixth channel center frequency segment field indicate two frequency segments, in the first band, in which the BSS is configured to operate.

9. The method according to claim 7, wherein the first frame further comprises the multi-band aggregation mode field;
the fifth channel center frequency segment field and the sixth channel center frequency segment field indicate two frequency segments, in the first band, in which the BSS is configured to operate; and
the multi-band aggregation mode field indicates bands to which frequency segments corresponding to the first channel center frequency segment field and the second channel center frequency segment field belong.

10. A multi-band indication method, comprising:
receiving, by a second communications device, a first frame from a first communications device;
parsing, by the second communications device, the first frame to obtain a first operating class field; and
determining, by the second communications device based on the first operating class field, a starting frequency of a second band in which a basic service set (BSS) configured to be established by the first communications device is configured to operate, wherein the BSS simultaneously is configured to operate in a first band and the second band, the first band is a band that comprises a primary channel, and the second band is a band that fails to include the primary channel, wherein the first frame further comprises N channel center frequency segment fields and a multi-band aggregation mode field, and a value of N is a positive integer greater than or equal to 2;

the multi-band aggregation mode field indicates a band to which a frequency segment corresponding to at least one channel center frequency segment field in the N channel center frequency segment fields belongs; and the N channel center frequency segment fields indicate N frequency segments in which the BSS is configured to operate.

11. The method according to claim 10, wherein in response to N being equal to 4, the N channel center frequency segment fields are a first channel center frequency segment field, a second channel center frequency segment field, a third channel center frequency segment field, and a fourth channel center frequency segment field;

the multi-band aggregation mode field indicates bands to which frequency segments corresponding to the second channel center frequency segment field, the third channel center frequency segment field, and the fourth channel center frequency segment field belong; and the first channel center frequency segment field, the second channel center frequency segment field, the third channel center frequency segment field, and the fourth channel center frequency segment field indicate four frequency segments in which the BSS is configured to operate.

12. The method according to claim 11, wherein the first frame further comprises a channel bandwidth field, and the channel bandwidth field indicates a BSS bandwidth;

a length of the channel bandwidth field is one byte; and in response to a value of the channel bandwidth field is 4, the channel bandwidth field indicates that the BSS bandwidth is 320 megahertz (MHz), 160+160 MHz, 80+80+160 MHZ, 160+80+80 MHz, 80+160+80 MHz, 80+80+80+80 MHz, 240+80 MHz, 80+240 MHz, 240 MHZ, 160+80 MHz, 80+160 MHz, or 80+80+80 MHZ.

13. The method according to claim 11, wherein a value of the first channel center frequency segment field, a value of the second channel center frequency segment field, a value of the third channel center frequency segment field, and a value of the fourth channel center frequency segment field are configured to be obtained by a value of a current channel center frequency indicator 0, a value of a current channel center frequency indicator 1, a value of a current channel center frequency indicator 2, and a value of a current channel center frequency indicator 3.

14. The method according to claim 13, wherein in response to a position of a working channel of the BSS is the following frequency position:

320 megahertz (MHz), the value of the first channel center frequency segment field is the value of the current channel center frequency indicator 0 minus 24, the value of the second channel center frequency segment field is the value of the current channel center frequency indicator 0 minus 8, the value of the third channel center frequency segment field is the value of the current channel center frequency indicator 0 plus 8, and the value of the fourth channel center frequency segment field is the value of the current channel center frequency indicator 0 plus 24; or 160+160 MHz, the value of the first channel center frequency segment field is the value of the current channel center frequency indicator 0 minus 8, the value of the second channel center frequency segment field is the value of the current channel center frequency indicator 0 plus 8, the value of the third channel center frequency segment field is the value of the current channel center frequency indicator 1 minus 8, and the value of the fourth channel center frequency segment field is the value of the current channel center frequency indicator 1 plus 8; or 80+80+160 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2 minus 8, and the value of the fourth channel center frequency segment field is the value of the current channel center frequency indicator 2 plus 8; or 160+80+80 MHz, the value of the first channel center frequency segment field is the value of the current channel center frequency indicator 0 minus 8, the value of the second channel center frequency segment field is the value of the current channel center frequency indicator 0 plus 8, the value of the third channel center frequency segment field is the value of the current channel center frequency indicator 1, and the value of the fourth channel center frequency segment field is the value of the current channel center frequency indicator 2; or 80+160+80 MHz, the value of the first channel center frequency segment field is the value of the current channel center frequency indicator 0, the value of the second channel center frequency segment field is the value of the current channel center frequency indicator 1 minus 8, the value of the third channel center frequency segment field is the value of the current channel center frequency indicator 1 plus 8, and the value of the fourth channel center frequency segment field is the value of the current channel center frequency indicator 2; or 80+80+80+80 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, and the value of the fourth channel center frequency segment field is the value of the current channel center frequency indicator 3; or 240+80 MHz, the value of the first channel center frequency segment field is the value of the current channel center frequency indicator 0 minus 16, the value of the second channel center frequency segment field is the value of the current channel center frequency indicator 0, the value of the third channel center frequency segment field is the value of the current channel center frequency indicator 0 plus 16, and the value of the fourth channel center frequency segment field is the value of the current channel center frequency indicator 1; or 80+240 MHz, the value of the first channel center frequency segment field is the value of the current channel center frequency indicator 0, the value of the second channel center frequency segment field is the value of the current channel center frequency indicator 1 minus 16, the value of the third channel center frequency segment field is the value of the current channel center frequency indicator 1, and the value of the fourth channel center frequency segment field is the value of the current channel center frequency indicator 1 plus 16; or 240 MHz, the value of the first channel center frequency segment field is the value of the current channel center frequency indicator 0 minus 16, the value of the second channel center frequency segment field is the value of the current channel center frequency indicator 0, the value of the third channel center frequency segment field is the value of the current channel center frequency indicator 0 plus 16, and the value of the fourth channel center frequency segment field is 0; or 160+80 MHz, the value of the first channel center frequency segment field is the value of the current channel center frequency indicator 0 minus 8, the value of the second channel center frequency segment field is the value of the current channel center frequency indicator 0 plus 8, the value of the third channel center frequency segment field is the value of the current channel center frequency indicator 1, and the value of the fourth channel center frequency segment field is 0; or 80+160 MHz, the value of the first channel center frequency segment field is the value of the current channel center frequency indicator 0, the value of the second channel center frequency segment field is the value of the current channel center frequency indicator 1 minus 8, the value of the third channel center frequency segment field is the value of the current channel center frequency indicator 1 plus 8, and the value of the fourth channel center frequency segment field is 0; or 80+80+80 MHz, the value of the first channel center frequency segment field is the value of the current channel center frequency indicator 0, the value of the second channel center frequency segment field is the value of the current channel center frequency indicator 1, the value of the third channel center frequency segment field is the value of the current channel center frequency indicator 2, and the value of the fourth channel center frequency segment field is 0.

15. The method according to claim 10, wherein the first frame further comprises a segment size field, and the segment size field indicates a segment size of each of the N channel center frequency segment fields.

16. The method according to claim 10, wherein in response to N being equal to 4, the N channel center frequency segment fields are a first channel center frequency segment field, a second channel center frequency segment field, a fifth channel center frequency segment field, and a sixth channel center frequency segment field;
- the first channel center frequency segment field and the second channel center frequency segment field are in a first operation element field;
- the fifth channel center frequency segment field and the sixth channel center frequency segment field are in a second operation element field; and
- the first operation element field and the second operation element field are in the first frame.

17. The method according to claim 16, wherein the first channel center frequency segment field and the second channel center frequency segment field indicate two frequency segments, in the second band, in which the BSS is configured to operate; and
- the fifth channel center frequency segment field and the sixth channel center frequency segment field are used to indicate two frequency segments, in the first band, in which the BSS is configured to operate.

18. The method according to claim 16, wherein the first frame further comprises the multi-band aggregation mode field;
- the fifth channel center frequency segment field and the sixth channel center frequency segment field indicate two frequency segments, in the first band, in which the BSS is configured to operate; and
- the multi-band aggregation mode field indicates bands to which frequency segments corresponding to the first channel center frequency segment field and the second channel center frequency segment field belong.

* * * * *